United States Patent
Lai et al.

(10) Patent No.: US 9,734,954 B2
(45) Date of Patent: Aug. 15, 2017

(54) CONDUCTING POLYMER/GRAPHENE-BASED MATERIAL COMPOSITES, AND METHODS FOR PREPARING THE COMPOSITES

(71) Applicants: Nanyang Technological University, Singapore (SG); Agency for Science, Technology and Research, Singapore (SG)

(72) Inventors: Linfei Lai, Singapore (SG); Zexiang Shen, Singapore (SG); Jianyi Lin, Singapore (SG)

(73) Assignees: Nanyang Technological University, Singapore (SG); Agency for Science, Technology and Research, Singapore (SG)

( * ) Notice: Subject to any disclaimer, the term of this patent is extended or adjusted under 35 U.S.C. 154(b) by 739 days.

(21) Appl. No.: 14/034,888

(22) Filed: Sep. 24, 2013

(65) Prior Publication Data
US 2014/0087192 A1 Mar. 27, 2014

Related U.S. Application Data

(60) Provisional application No. 61/705,024, filed on Sep. 24, 2012.

(51) Int. Cl.
*H01G 11/30* (2013.01)
*H01B 1/12* (2006.01)
*H01G 11/36* (2013.01)
*H01G 11/48* (2013.01)
*H01B 1/04* (2006.01)
*H01B 1/24* (2006.01)

(52) U.S. Cl.
CPC .............. *H01G 11/30* (2013.01); *H01B 1/04* (2013.01); *H01B 1/127* (2013.01); *H01B 1/128* (2013.01); *H01B 1/24* (2013.01); *H01G 11/36* (2013.01); *H01G 11/48* (2013.01); *Y02E 60/13* (2013.01); *Y10T 428/31* (2015.01)

(58) Field of Classification Search
None
See application file for complete search history.

(56) References Cited

U.S. PATENT DOCUMENTS

2011/0186805 A1* 8/2011 Bowers ............... H01L 29/1606
257/9
2011/0186818 A1* 8/2011 Bowers ................. H01L 29/12
257/29

(Continued)

OTHER PUBLICATIONS

Kumar et al. "Polyaniline-Grafted Reduced Graphene Oxide for Efficient Electrochemical Supercapaticors" ACSNano, vol. 6(2), 1715-1723, 2012.*

(Continued)

*Primary Examiner* — Robert S Loewe
(74) *Attorney, Agent, or Firm* — Alston & Bird LLP

(57) ABSTRACT

A composite comprising a conducting polymer and a graphene-based material is provided. The composite includes a graphene-based material doped with nitrogen or having a nitrogen-containing species grafted thereon, and a conducting polymer arranged on the graphene-based material. Methods of preparing the composite, and electrodes formed from the composite are also provided.

22 Claims, 12 Drawing Sheets

(56) References Cited

U.S. PATENT DOCUMENTS

| | | | |
|---|---|---|---|
| 2012/0161192 A1* | 6/2012 | Kim | C01B 31/0446 257/99 |
| 2012/0177995 A1* | 7/2012 | Sun | B82Y 30/00 429/231.8 |
| 2013/0216894 A1* | 8/2013 | Wang | H01M 4/13 429/158 |
| 2014/0030590 A1* | 1/2014 | Wang | H01B 1/04 429/211 |

OTHER PUBLICATIONS

Whitby et al. "Morphological effects of single-layer graphene oxide in the formation of covalently bonded polypyrrole composties using intermediate diisocyanate chemistry" J. Nanopart. Res. vol. 13, 4829-4837, 2011.*
Wu et al. "Doped Graphene Sheets As Anode Materials with Superhigh Rate and Large Capacity for Lithium Ion Batteries" ACSNano, vol. 5(7), 5463-5471, 2011.*
Stankovich et al. "Synthesis of graphene-based nanosheets via chemical reduction of exfoliated graphite oxide" Carbon, 2007, 45, 1558-1565.*
Zhang et al. "Conducting Polymers Directly Coated on Reduced Graphene Oxide Sheets as High-Performance Supercapacitor Electrodes" J. Phys. Chem. C 2012, 116, 5420-5426.*
Liu et al. "Synthesis, characterization and optical limiting property of covalently oligothiophene-functionalized graphene material" Carbon 2009, 47, 3113-3121.*
Kwon et al. "Flexible FET-Type VEGF Aptasensor Based on Nitrogen-Doped Graphene Converted from Conducting Polymer" ACS Nano, 6(2), 2012, 1486-1493.*
Lai et al. "Exploration of the active center structure of nitrogen-doped graphene-based catalysts for oxygen reduction reaction" Energy & Environmental Science, 2012, 5, 7936-7942.*
Abbas, G., et al., "Substitutional nitrogen incorporation through rf glow discharge treatment and subsequent oxygen uptake on vertically aligned carbon nanotubes," *Physical Review B*, 2007, vol. 75(19), pp. 195429-1 to 195429-9.
Abidian, M., et al., "Experimental and theoretical characterization of implantable neural microelectrodes modified with conducting polymer nanotubes," *Biomaterials*, 2008, vol. 29(9), pp. 1273-1283.
Aboutalebi, S., et al., "Comparison of GO, GO/MWCNTs composite and MWCNTs as potential electrode materials for supercapacitors," *Energy Environ. Sci.*, 2011, vol. 4(5), pp. 1855-1865.
Arbizzani, C., et al., "Polymer-Based Redox Supercapacitors: A Comparative Study," *Electrochimica Acta*, 1996, vol. 41(1), pp. 21-26.
Bleda-Martinez, M., et al., "Role of surface chemistry on electric double layer capacitance of carbon materials," *Carbon*, 2005, vol. 43(13), pp. 2677-2684.
Chen, Y., et al., "High performance supercapacitors based on reduced graphene oxide in aqueous and ionic liquid electrolytes," *Carbon*, 2011, vol. 49, pp. 573-580.
Cuentas-Gallegos, A., et al., "Nanocomposite Hybrid Molecular Materials for Application in Solid-State Electrochemical Supercapacitors," *Adv. Funct. Mater.*, 2005, vol. 15, pp. 1125-1133.
Dikin, D., et al., "Preparation and characterization of grapheme oxide paper," *Nature*, 2007, vol. 448, pp. 457-460.
Du, C., et al., "Supercapacitors using carbon nanotubes films by electrophoretic deposition," *Journal of Power Sources*, 2006, vol. 160, pp. 1487-1494.
Fan, Z., et al., "A Three-Dimensional Carbon Nanotube/Graphene Sandwich and Its Application as Electrode in Supercapacitors," *Adv. Mater.*, 2010, vol. 22, pp. 3723-3728.
Fang, B., et al., "Surface modification of carbonaceous materials for EDLCs application," *Electrochimica Acta*, 2005, vol. 50(18), pp. 3616-3621.

Frackowiak, E., et al., "Electrochemical storage of energy in carbon nanotubes and nanostructured carbons," *Carbon*, 2002, vol. 40(10), pp. 1775-1787.
Frackowiak, E., et al., "Optimisation of supercapacitors using carbons with controlled nanotexture and nitrogen content," *Electrochimica Acta*, 2006, vol. 51, pp. 2209-2214.
Frackowiak, E., et al., "Carbon materials for supercapacitor application," *Phys. Chem. Chem. Phys.*, 2007, vol. 9(15), pp. 1774-1785.
Gilje, S., et al., "A Chemical Route to Graphene for Device Applications," *Nano Letters*, 2007, vol. 7(11), pp. 3394-3398.
Girija, T., et al., "Analysis of polyaniline-based nickel electrodes for electrochemical supercapacitors," *Journal of Power Sources*, 2006, vol. 156(2), pp. 705-711.
Gomez, H., et al., "Graphene-conducting polymer nanocomposite as novel electrode for supercapacitors," *Journal of Power Sources*, 2011, vol. 196(8), pp. 4102-4108.
Hu, C., et al., "Ideal capacitive behavior of hydrous manganese oxide prepared by anodic deposition," *Electrochemistry Communications*, 2002, vol. 4(2), pp. 105-109.
Hu, Z., et al., "Polyaniline/$SnO_2$ nanocomposite for supercapacitor applications," *Materials Chemistry and Physics*, 2009, vol. 114(2-3), pp. 990-995.
Hua, W., et al., "X-ray absorption spectra of grapheme from first-principles simulations," *Physical Review B*, 2010, 82(15), pp. 155433-1 to 155433-7.
Hulicova-Jurcakova, D., et al., "Nitrogen-Enriched Nonporous Carbon Electrodes with Extraordinary Supercapacitance," *Adv. Funct. Mater.*, 2009, vol. 19, pp. 1800-1809.
Hulicova-Jurcakova, D., et al., "Effect of surface phosphorus functionalities of activated carbons containing oxygen and nitrogen on electrochemical capacitance," *Carbon*, 2009, vol. 47, pp. 1576-1584.
Hummers, W., et al., "Preparation of Graphic Oxide" *J. Am. Chem. Soc.*, 1958, vol. 80(6), p. 1339.
Inagaki, M., et al., "Carbon materials for electrochemical capacitors," *Journal of Power Sources*, 2010, vol. 195(24), pp. 7880-7903.
Ingram, M., et al., "'Activated' polypyrrole electrodes for high-power supercapacitor applications," *Solid State Ionics*, 2004, vol. 169, pp. 51-57.
Jansen, R., et al., "XPS Of Nitrogen-Containing Functional Groups On Activated Carbon," *Carbon*, 1995, vol. 33(8), pp. 1021-1027.
Jeong, H., et al., "Unoccupied electronic states in graphite oxides," *Chemical Physics Letters*, 2008, vol. 460(4-6), pp. 499-502.
Jin, X., et al., "Nanoscale Microelectrochemical Cells on Carbon Nanotubes," *Small*, 2007, vol. 3(9), pp. 1513-1517.
Jurewicz, K., et al., "Supercapacitors from nanotubes/polypyrrole composites," *Chemical Physics Letters*, 2001, vol. 347, pp. 36-40.
Jurewicz, K., et al., "Ammoxidation of active carbons for improvement of supercapacitor characteristics," *Electrochemica Acta*, 2003, vol. 48, pp. 1491-1498.
Khomenko, V., et al., "Determination of the specific capacitance of conducting polymer/nanotubes composite electrodes using different cell configurations," *Electrochimica Acta*, 2005, vol. 50(12), pp. 2499-2506.
Kim, F., et al., "Self-Propagating Domino-like Reactions in Oxidized Graphite," *Adv. Funct. Mater.*, 2010, vol. 20, pp. 2867-2873.
Kim, J., et al., Synthesis of polypyrrole and carbon nano-fiber composite for the electrode of electrochemical capacitors, *Materials Letters*, 2006, vol. 60(13-14), pp. 1697-1701.
Kim, Y., et al., "Easy preparation of nitrogen-enriched carbon materials from peptides of silk fibroins and their use to produce a high volumetric energy density in supercapacitors," *Carbon*, 2007, vol. 45, pp. 2116-2125.
Lai, L., et al., "One-step synthesis of $NH_2$-graphene from in situ graphene-oxide reduction and its improved electrochemical properties," *Carbon*, 2011, vol. 49(10), pp. 3250-3257.
Li, X., et al., "Simultaneous Nitrogen Doping and Reduction of Graphene Oxide," *J. Am. Chem. Soc.*, 2009, vol. 131, pp. 15939-15944.
Li, X., et al., "Electrochemical Behavior of Single-Walled Carbon Nanotube Supercapacitors Under Compressive Stress," *Acs Nano*, 2010, vol. 4(10), pp. 6039-6049.

(56) References Cited

OTHER PUBLICATIONS

Liangliang, T., et al., "Conducting Polymers as Electrode Materials for Supercapacitors," *Prog. Chem.*, 2010, vol. 22(10), pp. 1610-1618.

Lin, Z., et al., "Superior Capacitance of Functionalized Graphene," *The Journal Of Physical Chemistry C*, 2011, vol. 115, pp. 7120-7125.

Liu, A., et al., "Electrochemical Deposition of Polypyrrole/Sulfonated Graphene Composite Films," *J. Phys. Chem. C*, 2010, vol. 1 14, pp. 22783-22789.

Loh, K., et al., "Graphene oxide as a chemically tunable platform for optical applications," *Nature Chemistry*, 2010, vol. 2(12), pp. 1015-1024.

Lota, G., et al., "Effect of nitrogen in carbon electrode on the supercapacitor performance," *Chemical Physics Letters*, 2005, vol. 404, pp. 53-58.

Lozano-Castello, D., et al., "Influence of pore structure and surface chemistry on electric double layer capacitance in non-aqueous electrolyte," *Carbon*, 2003, vol. 41(9), pp. 1765-1775.

Masarapu, C., et al., "Effect of Temperature on the Capacitance of Carbon Nanotube Supercapacitors," *Acs Nano*, 2009, vol. 3(8), pp. 2199-2206.

Meng, C., et al., "Flexible carbon nanotube/polyaniline paper-like films and their enhanced electrochemical properties," *Electrochemistry Communications*, 2009, vol. 11(1), pp. 186-189.

Pacilé, D., et al., "Near-Edge X-ray Absorption Fine-Structure Investigation of Graphene," *Phys. Rev. Lett.*, 2008, vol. 101(6), pp. 066806-1 to 066806-4.

Pandolfo, A., et al., "Carbon properties and their role in supercapacitors," *Journal of Power Sources*, 2006, vol. 157, pp. 11-27.

Pantea, D., et al., "Electrical conductivity of thermal carbon blacks Influence of surface chemistry," *Carbon*, 2001, vol. 39, pp. 1147-1158.

Pantea, D., et al., "Surface Morphology Of Thermal, Furnace And Pyrolytic Carbon Blacks By Nitrogen Adsorption—Relation To The Electrical Conductivity," *Rubber Chemistry and Technology*, 2002, vol. 75(4), pp. 691-700.

Pognon, G., et al., "Performance and stability of electrochemical capacitor based on anthraquinone modified activated carbon," *Journal of Power Sources*, 2011, vol. 196, pp. 4117-4122.

Portet, C., et al., "Modification of Al current collector surface by sol-gel deposit for carbon-carbon supercapacitor applications," *Electrochimica Acta*, 2004, vol. 49, pp. 905-912.

Roy, S., et al., "The structure of amorphous carbon nitride films using a combined study of NEXAFS, XPS and Raman spectroscopies," *Thin Solid Films*, 2005, vol. 482(1-2), pp. 145-150.

Ruiz, V., et al., "Effects of thermal treatment of activated carbon on the electrochemical behavior in supercapacitors," *Electrochimica Acta*, 2007, vol. 52, pp. 4969-4973.

Ryu, K., et al., "Symmetric redox supercapacitor with conducting polyaniline electrodes," *Journal of Power Sources*, 2002, vol. 103(2), pp. 305-309.

Shafeeyan, M., et al., "A review on surface modification of activated carbon dioxide adsorption," *Journal of Analytical and Applied Pyrolysis*, 2010, vol. 89(2), pp. 143-151.

Shen, J., et al., "How carboxylic groups improve the performance of single-walled carbon nanotube electrochemical capacitors," *Energy Environ. Sci.*, 2011, vol. 4, pp. 4220-4229.

Shin, H., et al., "Efficient Reduction of Graphite Oxide by Sodium Borohydride and Its Effect on Electrical Conductance," *Adv. Funct. Mater.*, 2009, vol. 19(12), pp. 1987-1992.

Shrestha, S., et al., "Properties of Nitrogen-Functionalized Ordered Mesoporous Carbon Prepared Using Polypyrrole Precursor," *Journal of The Electrochemical Society*, 2010, vol. 157(11), pp. B1665-B1672.

Si, Y., et al., "Synthesis of Water Soluble Graphene," *Nano Letters*, 2008, vol. 8(6), pp. 1679-1682.

Snook, G., et al., "Conducting-polymer-based supercapacitor devices and electrodes," *Journal of Power Sources*, 2011, vol. 196(1), pp. 1-12.

Stankovich, S., et al., "Graphene-based composite materials," *Nature*, 2006, vol. 442(7100), pp. 282-286.

Stoller, M., et al., "Graphene-Based Ultracapacitors," *Nano Letters*, 2008, vol. 8(10), pp. 3498-3502.

Stoller, M., et al., "Best practice methods for determining an electrode material's performance for ultracapacitors," *Energy Environ. Sci.*, 2010, vol. 3(9), pp. 1294-1301.

Su, F., et al., "Nitrogen-containing microporous carbon nanospheres with improved capacitive properties," *Energy Environ. Sci.*, 2011, vol. 4, pp. 717-724.

Wang, D., et al., "Fabrication of Graphene/Polyaniline Composite Paper via In Situ Anodic Electropolymerization for High-Performance Flexible Electrode," *Acs Nano*, 2009, vol. 3(7), pp. 1745-1752.

Wang, H., et al., "Graphene oxide doped polyaniline for supercapacitors," *Electrochemistry Communications*, 2009, vol. 11(6), pp. 1158-1161.

Wang, H., et al., "A nanostructured graphene/polyaniline hybrid material for supercapacitors," *Nanoscale*, 2010, vol. 2(10), pp. 2164-2170.

Wu, Q., et al., "Supercapacitors Based on Flexible Graphene/Polyaniline Nanofiber Composite Films," *Acs Nano*, 2010, vol. 4(4), pp. 1963-1970.

Wu, Z., et al., "Anchoring Hydrous $RuO_2$ on Graphene Sheets for High-Performance Electrochemical Capacitors," *Adv. Funct. Mater.*, 2010, vol. 20(20), pp. 3595-3602.

Xiao, Q., et al., "The study of multiwalled carbon nanotube deposited with conducting polymer for supercapacitor," *Electrochimica Acta*, 2003, vol. 48, pp. 575-580.

Xu, J., et al., "Hierarchical Nanocomposites of Polyaniline Nanowire Arrays on Graphene Oxide Sheets with Synergistic Effect for Energy Storage," *Acs Nano*, 2010, vol. 4(9), pp. 5019-5026.

Yan, J., et al., "Preparation of a graphene nanosheet/polyaniline composite with high specific capacitance," *Carbon*, 2010, vol. 48(2), pp. 487-493.

Yang, X., et al., "Nitrogen-Enriched Nanocarbons with a 3-D Continuous Mesopore Structure from Polyacrylonitrile for Supercapacitor Application," *J. Phys. Chem. C*, 2010, vol. 114, pp. 8581-8586.

Yang, N., et al., "Layered nanostructures of polyaniline with graphene oxide as the dopant and template," *Synthetic Metals*, 2010, vol. 160(15-16), pp. 1617-1622.

Yoo, J., et al., "Ultrathin Planar Graphene Supercapacitors," *Nano Letters*, 2011, vol. 11, pp. 1423-1427.

Zhang, K., et al., "Graphene/Polyaniline Nanofiber Composites as Supercapacitor Electrodes," *Chem. Mater.*, 2010, vol. 22(4), pp. 1392-1401.

Zhang, L., et al., "Layered Graphene Oxide Nanostructures with Sandwiched Conducting Polymers as Supercapacitor Electrodes," *Langmuir*, 2010, vol. 26(22), pp. 17624-17628.

Zhang, L., et al., "Identification of the nitrogen species on N-doped graphene layers and Pt/NG composite catalyst for direct methanol fuel cell," *Phys. Chem. Chem. Phys.*, 2010, vol. 12(38), pp. 12055-12059.

\* cited by examiner

CONDUCTING POLYMER/GRAPHENE-BASED MATERIAL COMPOSITES, AND METHODS FOR PREPARING THE COMPOSITES

CROSS-REFERENCE TO RELATED APPLICATION

This application claims the benefit of priority of U.S. provisional application No. 61/705,024 filed on 24 Sep. 2012, the content of which is incorporated herein by reference in its entirety for all purposes.

TECHNICAL FIELD

The invention relates to composites containing a conducting polymer (CP) and a graphene-based material, and methods for their preparation. The invention also relates to electrodes containing the composites, which may be used in electrochemical supercapacitor applications.

BACKGROUND

Electrochemical supercapacitors have gained intense interests in advanced power research field due to its high power density, reversibility, long cycle life and high cycling stability, as well as small environmental impact. Much research carried out on electrochemical capacitors is targeted at increasing power and energy density.

Capacitance of supercapacitors may be divided into two basic types according to their charge storage mechanism. The first basic type relates to electrochemical double layer capacitance (EDLC), which is generated from charge separation at electrode/electrolyte interface, and value of EDLC is determined by the effective surface area and dielectric constant of the electrolyte.

The second basic type relates to pseudocapacitance generated from fast faradic reactions of the electrode material. Materials used to assemble supercapacitor devices are mainly focused on carbon, such as activated carbon, carbon nanotubes, and other porous carbon nanomaterials; metal oxide such as $RuO_2$, $MnO_2$, and $IrO_2$, and conducting polymers such as polyaniline, polypyrrole, and polythiophene.

The energy storage mechanism of all carbon based supercapacitor is EDLC, which has attributes such as long cycle life and good mechanical properties. However, performance of such supercapacitors is dependent on surface area of the material used, which does not involve Faradic reactions. As a result, carbon based supercapacitors have low SC value, which applies also for carbon nanomaterials such as CNT (less than 80 F/g) and chemically reduced graphene oxide (rG-O) (~150 F/g). Therefore, to increase specific capacitance (SC) value of carbon based capacitors, surface area and pore volume needs to be increased.

Energy storage mechanism of transition metal oxides and CPs are mainly pseudocapacitance, which relies on their reversible faradic reactions accompanied by red/ox and/or doping/dedoping of dopants. Even though pseudocapacitive energy storage mechanism is able to contribute large SC values, rapid degradation due to swelling and shrinkage of the polymers may lead to poor cycle stabilities.

In view of the above, there remains a need for an improved material which may be used in supercapacitor applications and which addresses one or more of the above-mentioned problems.

SUMMARY

In a first aspect, the invention relates to a composite comprising a conducting polymer and a graphene-based material. The composite comprises
a) a graphene-based material doped with nitrogen or having a nitrogen-containing species grafted thereon, and
b) a conducting polymer arranged on the graphene-based material.

In a second aspect, the invention relates to a method of preparing a composite comprising a conducting polymer and a graphene-based material. The method comprises
a) providing a graphene-based material doped with nitrogen or having a nitrogen-containing species grafted thereon;
b) contacting the graphene-based material with a solution comprising monomers of the conducting polymer; and
c) polymerizing the monomers of the conducting polymer on the graphene-based material in the presence of an oxidant to form the composite.

In a third aspect, the invention refers to an electrode formed from a composite according to the first aspect.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
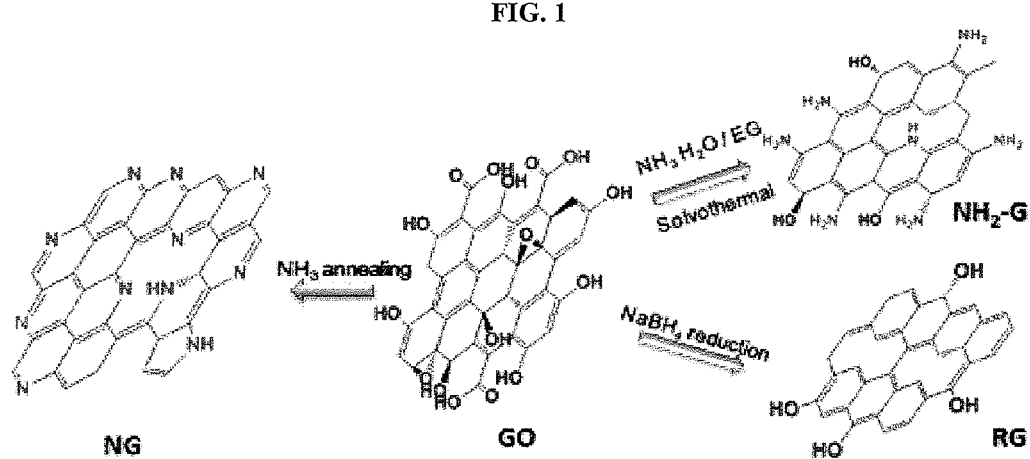
FIG. 1 is a schematic diagram showing chemical structures of nitrogen-doped reduced graphene oxide (NG), amine modified reduced graphene oxide ($NH_2$-G), chemically reduced graphene oxide (RG) and their synthesis methods from graphene oxide (GO).

By introducing one or more nitrogen atoms into the matrix of a graphene-based material, which may be carried out by doping the graphene-based material with nitrogen atom(s), or by grafting nitrogen-containing species to the graphene-based material, a more uniform layer of conductive polymer may be formed on the graphene-based material. The improved uniformity in the conductive polymer formed has been shown to result in increased pseudocapacitive charge production. Presence of the nitrogen atoms in the graphene matrix also results in improved charge transfer properties of the composite. Using composites according to various embodiments of the invention, capacitance with values as high as 500 Fg$^{-1}$ have been obtained. From the experiments carried out, it was also determined that introduction of N doping in form of pyridinic-N, pyrrolic-N and graphitic-N is advantageous for use of the composite material in electrodes in electrochemical applications involving alkaline electrolyte; whereas N in form of —NH$_2$ are more notable for capacitance value increment amplitude in electrochemical applications involving acidic electrolyte. Regardless of the type of electrolytes used, improved cyclability performances have been demonstrated. For example, no loss of capacitance over 680 cycles has been observed in some embodiments. These improved attributes render the composite suitable as electrode material for high performance applications, such as supercapacitor applications.

Accordingly, in a first aspect, the invention refers to a composite comprising a conducting polymer and a graphene-based material. The term "composite" as used herein refers to a material formed from two or more different components, and having a functional and/or a structural property that is different from that of the individual components. The composite comprises a graphene-based material and a conducting polymer. Examples of graphene-based material include, but are not limited to, graphene, graphene oxide, reduced graphene oxide, and mixtures thereof.

Graphene refers generally to a form of graphitic carbon, in which carbon atoms are covalently bonded to one another to form a two-dimensional sheet of bonded carbon atoms. The carbon atoms may be bonded to one another via sp$^2$ bonds, and may form a 6-membered ring as a repeating unit, and may further include a 5-membered ring and/or a 7-membered ring. In its crystalline form, two or more sheets of graphene may be stacked together to form multiple stacked layers. Generally, the side ends of graphene are saturated with hydrogen atoms.

Graphene oxide refers to oxidized forms of graphene, and may include an oxygen-containing group such as a hydroxyl group, an epoxide group, a carboxyl group, and/or a ketone group. Reduced graphene oxide refers to graphene oxide which has been subjected to a reduction process, thereby partially or substantially reducing it. For example, after subjecting the graphene oxide to a reduction process, some of the oxygen-containing groups remain in the reduced graphene oxide that is formed. The reduction process may take place via a chemical route, or by thermal treatment. Although graphene may also be obtained by reducing graphene oxide, the term "reduced graphene oxide" as used herein does not refer to graphene. By at least partially reducing graphene oxide to form reduced graphene oxide, while not reducing it to graphene, some of the oxygen-containing groups may be removed from graphene oxide thereby partially restoring the graphene sp$^2$ network. In so doing, this allows charge transfer to take place in the restored graphene network, thereby conferring electrical conductivity to the material.

In various embodiments, the graphene-based material comprises graphene oxide, reduced graphene oxide, or mixtures thereof. For example, the graphene-based material may comprise or consist of graphene oxide. In some embodiments, the graphene-based material comprises or consists of reduced graphene oxide. In specific embodiments, the graphene-based material consists of reduced graphene oxide.

The graphene-based material that is comprised in the composite is doped with nitrogen or has a nitrogen-containing species grafted thereon. In various embodiments, the graphene-based material that is comprised in the composite is doped with nitrogen.

The term "doped" as used herein refers to substitution of a carbon atom in the graphene-based material with an atom of another element. For example, heteroatoms such as nitrogen atom may be introduced into the carbon lattice of graphene by doping.

In various embodiments, the nitrogen in the graphene-based material doped with nitrogen may be pyridinic-N, pyrrolic-N, graphitic-N, or mixtures thereof. Pyridinic-N denotes pyridinic nitrogen, and refers to nitrogen atoms that bond with two carbon atoms at the edges or defects of graphene and which contributes one p electron to the π system of graphene. Pyrrolic-N denotes pyrrolic nitrogen, and refers to nitrogen atoms that contribute two p electrons to the π system of graphene. Graphitic-N, otherwise termed as quaternary-N, denotes graphitic nitrogen, and refers to nitrogen atoms that substitute for carbon atoms in the graphene matrix.

In various embodiments, the graphene-based material that is comprised in the composite has a nitrogen-containing species grafted thereon. Examples of nitrogen-containing species include, but are not limited to, an amide group (—C(O)N), a nitrile group (—C≡N), and an amine group (—NH$_2$). The term "grafted" as used herein refers to formation of one or more chemical bonds between two molecules. In contrast to doping, wherein the nitrogen atom directly substitutes the carbon atom in the graphene-based material, the nitrogen-containing species are attached to the graphene-based material by bonding with carbon, thereby introducing one or more nitrogen atoms into the carbon material. In specific embodiments, the nitrogen-containing species is —NH$_2$. Advantageously, —NH$_2$ modification of graphene is an effective method to improve the graphene capacitance value due to the introduction of pseudocapacitive interactions and improved wettability.

The composite comprises a conducting polymer arranged on the graphene-based material. In various embodiments, the conducting polymer is arranged directly on the graphene-based material, for example, the conducting polymer is in contact with the graphene-based material, and there are no intervening layers between the conducting polymer and the graphene-based material. This may be the case when the conducting polymer is formed directly on the graphene-based material.

Conducting polymers refer generally to polymers which are capable of electronic conduction. In various embodiments, the conducting polymers have a conjugated π-backbone that renders the polymers capable of conducting electronic charge. Examples of a conductive polymer include, but are not limited to, polypyrrole and its derivatives and copolymers; polythiophene and its derivatives and copolymers, including poly(3-alkyl thiophenes) and poly(3,4-ethylenedioxythiophene) (PEDOT); polyaniline and its derivatives and copolymers; poly(p-phenylene vinylene) and its derivatives and copolymers; polysulfone and its derivatives and copolymers; and polyacetylene and its derivatives and copolymers.

In various embodiments, the conducting polymer is selected from the group consisting of polyaniline, polypyrrole, polythiophene, poly(phenylenevinylene), poly(phenylene sulfide), polydiphenylamine, polythienylenevinylene, bithiophene, polyethylenedioxythiophene, polytriazine, polyacetylene, derivatives thereof, and mixtures thereof. In specific embodiments, the conducting polymer is polyaniline or polypyrrole. Polyaniline, denoted herein as PANi, is particularly advantageous due to its low cost, ease of synthesis, good conductivity, fast redox rate and high pseudocapacitance.

The amount of conducting polymer in the composite may be in the range of about 1 wt % to about 10 wt %, such as about 1 wt % to about 8 wt %, about 1 wt % to about 6 wt %, about 1 wt % to about 4 wt %, about 1 wt % to about 3 wt %, about 3 wt % to about 10 wt %, about 5 wt % to about 10 wt %, about 7 wt % to about 10 wt %, about 8 wt % to about 10 wt %, about 9 wt % to about 10 wt %, about 6 wt % to about 8 wt %, about 8 wt %, about 9 wt %, or about 10 wt %.

In specific embodiments, the amount of conducting polymer in the composite is about 10 wt %. Advantageously, it has been found by inventors of the present application that embodiments of conducting polymer/graphene-based material composite with conducting polymers present in a weight ratio of about 10 wt % provide the highest specific capacitance value. This may be due to low or negligible levels of aggregation of the conducting polymers, thereby resulting in a uniform coating on the graphene-based material, as well as low or negligible blockage of graphene interlayers by the conducting polymers at this weight ratio.

The conducting polymer may be arranged on the graphene-based material as a layer having an at least substantially uniform thickness. The thickness of the conducting polymer on the graphene-based material may be less than about 10 nm, such as in the range of about 1 nm to about 10 nm, about 1 nm to about 8 nm, about 1 nm to about 6 nm, about 1 nm to about 4 nm, about 3 nm to about 10 nm, about 5 nm to about 10 nm, about 7 nm to about 10 nm, about 3 nm to about 8 nm, about 3 nm to about 6 nm, about 2 nm to about 4 nm, about 6 nm to about 8 nm, about 1 nm, about 2 nm, about 3 nm, about 4 nm, about 5 nm, about 6 nm, about 7 nm, about 8 nm, about 9 nm, or about 10 nm. Advantageously, conducting polymers which are present as thin films of less than 10 nm on the graphene-based material have been shown to be effective for fully reversible and rapid Faradic reactions, whereby the conducting polymers provide pseudocapacitive charge storage.

The graphene-based material may comprise or consist of reduced graphene oxide doped with nitrogen, and the conducting polymer may comprise or consist of polypyrrole. In some embodiments, the graphene-based material comprises or consists of reduced graphene oxide grafted with —NH$_2$, and the conducting polymer comprises or consists of polyaniline.

In a second aspect, the invention relates to a method of preparing a composite comprising a conducting polymer and a graphene-based material. The method comprises providing a graphene-based material doped with nitrogen or having a nitrogen containing species grafted thereon. Examples of suitable graphene-based material which may be used have already been described above. In various embodiments, the graphene-based material doped with nitrogen or having a nitrogen-containing species grafted thereon comprises or consists of reduced graphene oxide.

Providing the graphene-based material doped with nitrogen may include annealing a graphene-based material in an environment consisting essentially of an inert gas and ammonia. The term "annealing" as used herein refers to heating or subjecting a material to elevated temperatures for a period of time. In so doing, dopant atoms such as nitrogen may diffuse into the graphene-based material, thereby doping it. Specifically, during the heating process, some C—C and C—O bonds may rupture to form pyridinic-N and graphitic-N species in the graphene matrix. Accordingly, it has been found that nitrogen atoms that are present in the graphene-based materials formed by annealing exist mostly in the pyridinic and graphitic forms.

Annealing of the graphene-based material may be carried out at any suitable temperature. In various embodiments, annealing the graphene-based material is carried out at a temperature in the range of about 200° C. to about 1000° C. For example, the graphene-based material may be annealed at a temperature in the range of about 200° C. to about 800° C., about 200° C. to about 600° C., about 200° C. to about 400° C., about 400° C. to about 800° C., about 400° C. to about 600° C., about 400° C. to about 500° C., about 500° C. to about 1000° C., about 500° C. to about 700° C., about 600° C. to about 1000° C., about 600° C. to about 700° C., about 500° C. to about 600° C., about 500° C., about 550° C., or about 600° C. In specific embodiments, the graphene-based material is annealed at a temperature of about 550° C.

In various embodiments, ammonia gas is used as the source of dopant atoms. Due to the high temperatures involved in annealing, besides the presence of ammonia, annealing of the graphene-based material is carried out in an inert gas environment. Examples of inert gas include noble gases such as helium, neon, argon and krypton; nitrogen, and mixtures thereof. In various embodiments, the inert gas comprises or consists of argon.

The amount of ammonia gas in the environment may be in the range of about 1 wt % to about 100 wt %, such as about 1 wt % to about 80 wt %, about 1 wt % to about 40 wt %, about 1 wt % to about 20 wt %, about 1 wt % to about 10 wt %, about 1 wt % to about 8 wt %, about 1 wt % to about 6 wt %, about 1 wt % to about 5 wt %, about 1 wt % to about 4 wt %, about 1 wt % to about 2 wt %, about 3 wt % to about 70 wt %, about 3 wt % to about 50 wt %, about 3 wt % to about 10 wt %, about 5 wt % to about 80 wt %, about 5 wt % to about 50 wt %, about 5 wt % to about 10 wt %, about 8 wt % to about 10 wt %, about 10 wt % to about 100 wt %, about 10 wt % to about 60 wt %, about 10 wt % to about 30 wt %, about 20 wt % to about 80 wt %, about 20 wt % to about 60 wt %, or about 40 wt % to about 70 wt %. In various embodiments, the amount of ammonia gas in the environment is in the range of about 2 wt % to about 8 wt %, about 3 wt % to about 7 wt %, about 4 wt % to about 6 wt %, about 3 wt %, about 4 wt %, about 5 wt %, about 6 wt %, or about 7 wt %. In specific embodiments, the amount of ammonia gas in the environment is about 5 wt %.

Providing the graphene-based material having a nitrogen-containing species grafted thereon may comprise dispersing a graphene-based material in a solution comprising a reducing agent to form a first suspension; adding a solution comprising a nitrogen-containing species to the first suspension to form a second suspension; and subjecting the second suspension to a solvothermal process to graft the nitrogen-containing species on the graphene-based material.

As mentioned, the graphene-based material may be dispersed in a solution comprising a reducing agent to form a first suspension. The term "reducing agent" as used herein, refers to an agent that donates electrons in an oxidation-reduction reaction. In various embodiments, the reducing agent comprises or consists of a polar organic solvent. Examples of polar organic solvents include, but are not limited to, alcohols such as methanol, ethanol and propanol; ketones, amides, amines, nitriles, acetates, ethers, and aldehydes. Specific examples of reducing agents that may be used include, but are not limited to, ethylene glycol, a hydrazine compound, hydrogen, formaldehyde, and hydroxylamine. For example, the reducing agent may be a hydrazine compound containing a hydrazino-group. Examples of a hydrazine compound that may be used include hydrazine, hydrazine hydrochloride, hydrazine sulfate, hydrazine hydrate, hydrazine monohydrate, phenyl hydrazine, benzyl hydrazine, and ethyl hydrazine. In one embodiment, the reducing agent comprises or consists of ethylene glycol. In embodiments in which the graphene-based material is graphene oxide, for example, the reducing agent may be used to reduce graphene oxide (GO) to remove some of the oxygen-containing groups in GO so as to form reduced graphene oxide (RGO). By doing so, the insulating graphene oxide may be converted to reduced graphene oxide, which is conductive.

The choice of a liquid medium to form the solution may depend on factors such as conductivity of the liquid medium and the type of reducing agent used. A suitable liquid medium may, for example, be one that has a high dielectric constant. In various embodiments, the liquid medium is an organic solvent. Organic solvents that are generally polar, such as alcohols and ketones, may be used. Examples of organic solvents that may be used include dimethylformamide, ethanol, acetone, and methyl ethyl ketone, to name a few. Alternatively, the liquid medium may be an aqueous medium, such as water.

In various embodiments, the graphene-based material may be homogeneously dispersed within the solution. For example, when graphene oxide or reduced graphene oxide is used, due to the presence of oxygen-containing groups, the graphene oxide or reduced graphene oxide may be hydrophilic, and may be dispersed readily into individual sheets of graphene oxide or reduced graphene oxide in a suitable liquid medium. Mechanical stirring or ultrasonication may optionally be used to disperse the graphene-based material within the solution comprising a reducing agent.

Providing the graphene-based material having a nitrogen-containing species grafted thereon may further include adding a solution comprising a nitrogen-containing species to the first suspension to form a second suspension. In various embodiments, the solution comprising a nitrogen-containing species may be ammonia water. Agitation methods such as mechanical stirring or ultrasonication may optionally be used to allow improved mixing between the first solution comprising a nitrogen-containing species and the first suspension.

The second suspension may then be subjected to a solvothermal process to graft the nitrogen-containing species on the graphene-based material. A solvothermal process refers generally to a heating process which is carried out in a pressure vessel. By carrying out the process in a pressure vessel, this allows the reaction to be carried out at an elevated pressure about 1 atm, which may be up to about 5 atm, about 10 atm, about 20 atm, about 30 atm, about 40 atm, about 50 atm, or higher. The elevated pressure allows the reaction to be carried out at temperatures which are higher than the respective boiling points of the reagents.

In various embodiments, the solvothermal process is carried out at a temperature in the range of about 80° C. to about 250° C., such as about 100° C. to about 250° C., 150° C. to about 250° C., about 200° C. to about 250° C., about 80° C. to about 200° C., about 80° C. to about 150° C., about 100° C. to about 200° C., about 100° C. to about 150° C., about 150° C. to about 200° C., about 150° C., about 180° C., or about 200° C. In specific embodiments, the solvothermal process is carried out at a temperature of about 180° C.

In embodiments whereby the nitrogen-containing species is ammonia water, for example, ammonium ions in ammonia water may attack the oxygenated groups of the graphene-based material and generate primary amine groups, which form the nitrogen-containing species, at the surface of the graphene-based material by nucleophilic replacement. Accordingly, in these embodiments, primary amine functional groups, which are grafted on the graphene-based material, coexist with pyridinic nitrogen in the graphene matrix.

The method according to the second aspect includes contacting the graphene-based material with a solution comprising monomers of the conducting polymer, and polymerizing the monomers of the conducting polymer on the graphene-based material in the presence of an oxidant to form the composite.

Examples of conducting polymers that may be used have already been discussed above. In various embodiments, the conducting polymer is polyaniline or polypyrrole. According, monomers of these conducting polymers are respectively aniline and pyrrole.

The polymerization reaction is carried out in the presence of an oxidant. Examples of oxidant that may be used include iron (III) salts, copper (II) salts, silver (I) salts, hydrogen peroxide, ammonium persulfate, and mixtures thereof. In various embodiments, the oxidant is selected from the group consisting iron (III) chloride, ammonium persulfate, and mixtures thereof. Polymerizing the monomers of the conducting polymer on the graphene-based material may be carried out in the absence of light, and at a temperature in the range of about 0° C. to about 10° C. In various embodiments, the polymerization reaction is carried out at a temperature in the range of about 0° C. to about 10° C., such as about 0° C. to about 8° C., 0° C. to about 6° C., 0° C. to about 4° C., 0° C. to about 2° C., about 5° C., about 4° C., about 3° C., about 2° C., about 1° C., or about 0° C.

Advantageously, introduction of nitrogen atoms in the graphene network of the graphene-based material facilitates uniform growth of the conducting polymer thereon. This in turn translates into pseudocapacitance generation due to the uniform layers of conducting polymer formed. There is improvement in electrical properties of the graphene-based material, which may be result of synergistic effect from pseudocapacitance generation due to the uniform layers of conducting polymer formed, and improved charge transfer efficiency due to improved conductivity of the graphene-based material that has been doped with nitrogen or which has a nitrogen-containing species grafted thereon.

In a third aspect, the invention refers to an electrode formed from a composite according to the first aspect. The composite may be used as electrode material for supercapacitors, lithium batteries, bio sensors and gas sensors. For example, it has been demonstrated herein that an electrode comprising a composite containing conducting polymers and a graphene-based material according to various embodiments of the invention may be used as electrodes in supercapacitors, and improved performance, such as high energy and power densities, have been achieved. Besides its use as an electrode material in supercapacitors, batteries, and sensors, the composite may also be used in the manufacture of transparent or semi-transparent film electrodes in solar energy conversion devices, as well as substrate for surface enhanced resonance spectroscopy (SERS). In various embodiments, the electrode may be an electrode comprised in a supercapacitor, a sensor, a hybrid electrochemical device, a rechargeable battery, or a metal-air battery.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Embodiments of the invention relate to a low cost method of preparing composites comprising a conducting polymer and a graphene-based material. Embodiments of the invention have been shown to exhibit high capacitive performance and long cycle life for electrochemical supercapacitors applications.

Generally, in the experiments carried out, a graphene-based material, reduced graphene oxide, has been selected as a model carbon carrier for loading of polyaniline and polypyrrole. Nitrogen is introduced to the graphene-based material by solvothermal or high temperature (more than 550° C.) $NH_3$ gas annealing method as shown in FIG. 1.

Four types of composites have been prepared in order to compare their performance, as follows.

1. Graphene oxide (denoted herein as GO or G-O) is prepared from chemically exfoliation of graphite using a modified Hummers method.
2. Nitrogen-doped reduced graphene oxide (denoted herein as NG or N-RG-O) was produced from annealing GO, under inert gas protection with $NH_3$ gas as nitrogen source.
3. Primary amine modified reduced graphene oxide (denoted herein as $NH_2$-G or $NH_2$-RG-O) was prepared from one-step solvothermal reduction of GO, which was functionalized with primary amine groups meanwhile.
4. For comparison purposes only, GO is reduced by chemical method to remove most of the surface functionalities to obtain chemically reduced G-O (RG or RG-O), which has similar surface character as that of activated carbon which is used as commercial supercapacitor electrodes.

As examples of conducting polymers, polypyrroles and polyanilines have been used.

In various embodiments, in order to investigate the effect of graphene surface chemistry on the electrochemical performance of graphene/polyaniline composites as supercapacitor electrodes, graphene oxide (G-O), chemically reduced G-O (RG-O), nitrogen-doped RG-O (N-RG-O) and amine modified RG-O ($NH_2$-RG-O) were selected as carriers and loaded with about 10 wt % of polyaniline (PANi).

The surface chemistry of these materials was analyzed by FTIR, NEXAFS, and XPS, and the type of surface chemistry was found to be important for growth of PANi that influences the magnitude of increase of specific capacitance.

According to various embodiments, nitrogen-containing graphene-based material is utilized as polymer growth substrate. In contrast to situations in which CP is simply grown on pristine carbon (e.g. activated carbon, graphite, and CNT) without any type of surface functionalities, a homogeneous coating of polymer can be achieved when CP is grown on nitrogen-containing carbon. Electron donor character of nitrogen enhances electronic properties of carbon, and also provides active sites for monomer growth. Different from other element modification, such as oxygen, nitrogen is advantageous for conductivity improvement. Through controlling the N introduction method, N species on carbon may be tuned from —$NH_2$ to pyridinic, pyrrolic, and graphitic N. For supercapacitor applications, introduction of nitrogen before growth of CP may be used to obtain composites with high cycling stability and specific capacitance.

For example, from the experiments carried out for polyaniline, the $NH_2$-RG-O/PANi composite according to various embodiments exhibited the largest increase in capacitance with a value as high as 500 $Fg^{-1}$, and good cyclability with no loss of capacitance over 680 cycles, much better than that of RG-O/PANi, N-RG-O/PANi, and G-O/PANi when measured in a 3-electrode system. $NH_2$-RG-O/PANi//N-RG-O supercapacitor cell has a capacitance of 79 $Fg^{-1}$, and the corresponding specific capacitance for $NH_2$-RG-O/PANi is 395 $Fg^{-1}$. As demonstrated herein, —$NH_2$ may be introduced to RG-O to achieve highly stable cycling performance and high capacitance values.

Example 1: Materials Synthesis and Characterization of PPy Containing Composites Example 1.1 Preparation of Graphene Oxide (GO)

GO was prepared from natural flake graphite powder using the method as reported in W. S. Hummers et al., *Journal of the American Chemical Society* 80 (1958), 1339-1339.

Briefly, 5 g of graphite and 3.5 g of sodium nitrate ($NaNO_3$) were placed in a flask. 350 mL of sulfuric acid ($H_2SO_4$) were added with stirring in an ice-bath environment. This was followed by addition of 10 g of potassium permanganate ($KMnO_4$) with vigorous stirring for 2 hours, and the resultant mixture was kept for 6 days at room temperature. 200 mL of 5 wt % $H_2SO_4$ was then added to the mixture and the system was kept at 98° C. under fluxing for 2 hours. The temperature was subsequently reduced to 50° C., and 10 mL of hydrogen peroxide ($H_2O_2$) (30 wt % aqueous solution) was added to terminate the reaction.

The resultant mixture was purified by repeating the following procedure: washing (1 L of 3 wt % $H_2SO_4$), followed by water ($H_2O$) under centrifugation until the supernatant is colorless with pH value around 6.0. The product is then dispersed to 5 mg/mL under ultrasonication (140 W for 2 h) and freeze dried for further use.

Example 1.2 Synthesis of $NH_2$-G $NH_2$-G was prepared using the following method. 100 mg of GO was added to 40 mL of ethylene glycol under ultrasonication. After addition of 1 mL of ammonia water, the dark brown solution was transferred to a Teflon lined autoclave for solvothermal reaction at 180° C. for 10 h. After reaction, the precipitate was filtered and washed repeatedly with distilled water and dried at 60° C. for 24 h for further usage.

Example 1.3 Synthesis of N-G and R-G

N-G was prepared by annealing GO in 550° C. in ammonia (NH$_3$) gas having a flow rate of 2.5 ccm/s. Briefly, 500 mg of GO was put in tube furnace with argon (Ar) flow of 50 sccm (5% NH$_3$), the temperature was increased to 550° C. in 20 mins, and kept for half an hour. The as-resulted sample was grounded, and washed repeatedly with distilled water and dried at 60° C. for 24 h for further usage.

R-G was prepared by chemical reduction: 500 mg of GO was dipped in aqueous sodium borohydride (NaBH$_4$) (50 mM) solutions for 2 h. The resulting sample was washed repeatedly by distilled water and dried at 60° C. in 1 h.

Example 1.4 Synthesis of Pyrrole/Graphene (PPy/Graphene) Composite

Chemical polymerization of pyrrole on different surface functionalized graphene was performed with iron (III) chloride (FeCl$_3$) as an oxidant. 200 mg of different graphene was ultrasonically dispersed in 200 mL of methanol, followed by dropwise addition of 3.31 mL of 0.1 M pyrrole in methanol. After 10 mins, 6.62 mL of 0.2 M FeCl$_3$ was added dropwise. The solution was shielded from light and kept in an icy bath, with magnetic stirring for 8 hours for full polymerization. The product was washed with a large amount of water and subsequently rinsed several times with ethanol and acetone to remove the residual oxidant.

Example 1.5 Characterization

Surface chemical composition of the samples was determined by X-ray photoelectron spectroscopy (XPS) on a VG ESCALAB 250 spectrometer (Thermo Electron, U.K.), using Al Kα X-ray source (1486 eV).

Scanning electron microscope (SEM) images were obtained with a field-emission scanning electron microscope (FESEM, JEOL JSM-6700F).

Example 2: Electrochemical Measurements of PPy Containing Composites

Cyclic Voltammetry (CV) galvanostatic and impedance spectroscopy were used to characterize the electrodes using 6 M potassium hydroxide (KOH) as electrolyte in a three-electrode cell using Autolab PGSTAT302 electrochemical test system (Eco Chemie, The Netherlands). CV characteristics of four composites were recorded at different scan rates from 2 mV/s to 50 mV/s.

Galvanostatic charge/discharge tests were carried out under different current density with a sampling rate of 20 ms. Electrochemical impedance spectroscopy measurements were carried out in the frequency range of 100 kHz to 100.01 Hz. The applied voltage was 10 mV.

The composites were assembled onto nickel foam current collectors. 80% of PPy/graphene composite (20 mg), 10% carbon black, and 10% poly (vinylidene fluoride) (PVDF) were dispersed in N-methylpyrrolidinone (NMP) and mixed to form slurries. The slurries were coated on nickel foam substrate and dried at 80° C. for 10 min under vacuum. As formed electrodes were then pressed at a pressure of 2 MPa cm$^2$, and dried again under vacuum at 80° C.

To assemble an asymmetric supercapacitor, the RG-PPy, NG-PPy and NG films were prepared by rolling the electrode slurry using a roll-to-roll machine, and cut to planar circular shape with diameter of 1 cm. Filter paper with pore diameter of about 1 μm to 2 μm was used as separator. Mass ratio of active materials (anode/cathode) was 2.5:1.5. Electrochemical measurement of RG-PPy//NG and NG-PPy//NG were carried out using an electrochemical workstation.

Specific capacitance of the asymmetric supercapacitor was calculated from equation (1):

$$C_{total} = I/[(dE/dt) \times m] \quad (1)$$

$C_{total}$ denotes capacitance of device; I denotes constant charging/discharging current; m denotes mass of the electrode active materials ($m_{anode} + m_{cathode}$) including the weight of binder and active carbon.

Specific capacitance of NG-PPy was calculated from the following equation: $C_{spec} = 4C_{total}$. Energy density E of the full cell was calculate from equation (2), where V denotes the maximum cell voltage.

$$E = C_{total} V^2 \times 1000/(2 \times 3600) (Wh/kg) \quad (2)$$

Example 3: Discussion on Results Obtained from PPy Containing Composites

NG, RG, and NH$_2$-G were prepared from GO by different methods having a chemical structure shown in FIG. 1.

Thickness of the GO sheets is about 15 nm as confirmed using Atomic Force Microscopy (AFM), which indicates the as-prepared GO is in tens of layers.

NG was produced from annealing GO at 550° C., under inert gas as protection with NH$_3$ gas as nitrogen source. NH$_2$-G (primary amine modified graphene) was prepared from one-step solvothermal reduction of GO, which was functionalized with primary amine groups meanwhile. GO was reduced by NaBH$_4$ as mentioned above, and labeled as RG.

Example 3.1 Results from X-ray Photoelectron Spectroscopy (XPS)

Figure 2:
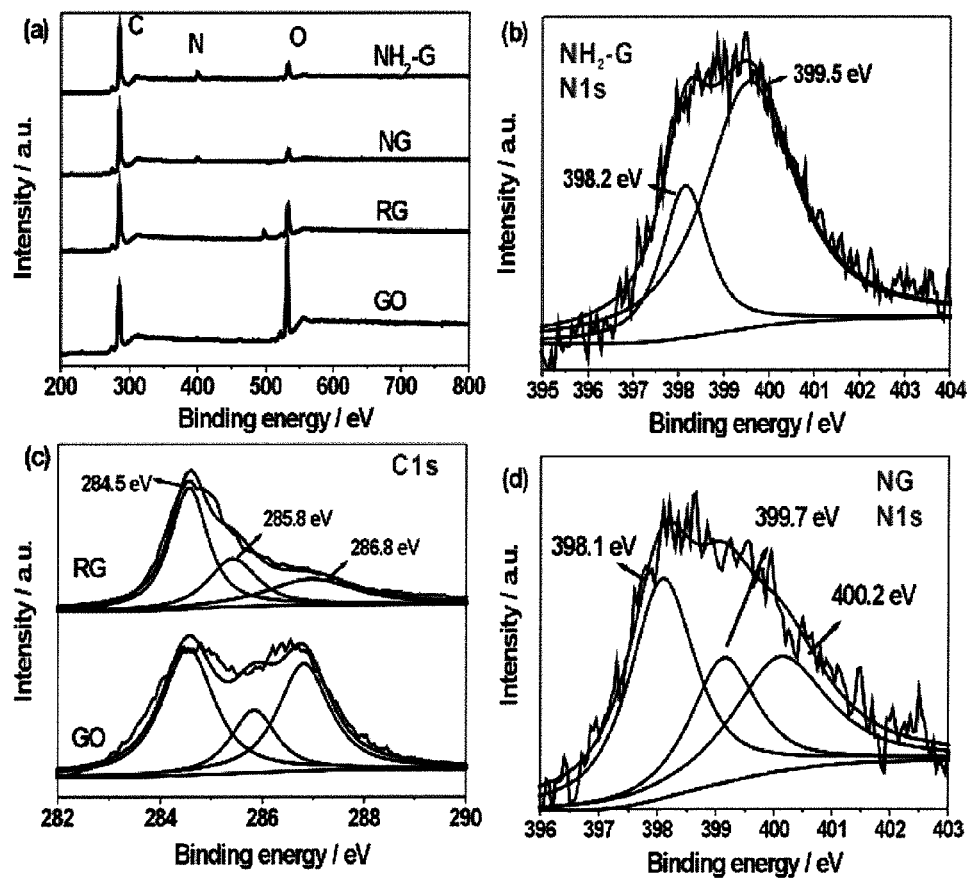
FIG. 2 are graphs depicting X-ray photoelectron spectroscopy (XPS) survey scans of (a) GO, RG, NG and $NH_2$-G; (b) N1s spectrum of $NH_2$-G; (c) C1s spectrum of GO and RG; and (d) N1s spectrum of NG. y-axis: intensity (a.u.); x-axis: binding energy (eV).

The surface character of NG, GO, RG, and NH$_2$-G was identified by XPS, as shown in FIG. 2. FIG. 2a shows the survey scan of four samples normalized by the intensity of carbon peak (at 284.5 eV). The survey scans of GO shows the highest intensity of oxygen peak at about 530 eV as compared with those of NG, RG, and NH$_2$-G. The C1s peak of GO and RG can be fitted with three components at binding energies of 284.5, 285.8, 286.8 eV, corresponding to sp$^2$ hybridized C atoms, C—OH/C—O, and C=O groups, respectively.

RG shows a considerable decrease of oxygen concentration in the form of C—O and C=O groups (FIG. 2c). The atomic ratio of C to O as calculated from XPS spectrum is 10.7:1 for NH$_2$-G, 1.9:1 for GO, 9.8:1 for RG, and 13.5:1 for NG. The high C to O ratio of NH$_2$-G, NG and RG indicates the de-oxygenation or reduction of GO, therefore the oxidation associated structural and electronic perturbations, would be eliminated and the conductivity recovered.

For nitrogen in NG, the binding energies around 400.2, 398.1 and 399.7 eV represent pyrrolic, pyridinic, and quaternary nitrogen respectively, with molar ratio of 0.32:0.43:0.25 (FIG. 2d). On the other hand, NH$_2$-G have two deconvoluted peaks at 398.2 and 399.5 eV which are assigned as pyridinic N and primary amine (—NH$_2$) with atomic ratio of 0.76:0.24 (FIG. 2b). As can be seen and will be illustrated in a further example, —NH$_2$ modification of graphene is an effective method to improve the graphene capacitance value due to the introduction of pseudocapacitive interactions and improved wettability. Although NH$_2$-G has higher nitrogen concentration (8.6%) than that of NG (4.3%), NG has abundant quaternary and pyridinic nitrogen which are proven to be capable of helping electron transfer and enhancing pseudocapacitance generation.

However, compared with N doping in graphene network in the form of mainly pyrrolic and pyridinic nitrogen, ionizable primary amines are supposed to better facilitators for polymer growth. Therefore, $NH_2$-G and NG should have different effect on polymer growth and pseudocapacitance increment magnitude after polymer loading.

Example 3.2 Investigation on Loading of PPy in Graphene Matrix

Figure 3:
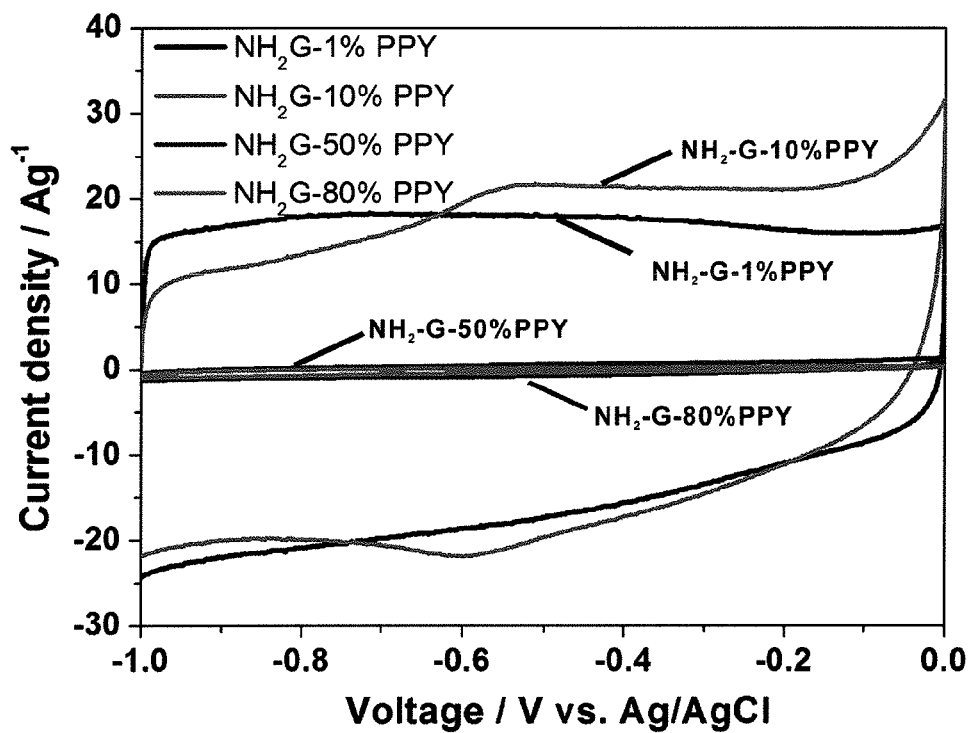
FIG. 3 are cyclic voltammetry curves of primary amine modified graphene ($NH_2$-G) with different polypyrrole doping weight ratio from 1 to 80% PPy (Ppy denotes polypyrrole) at a scan rate of 50 $mVs^{-1}$ in 6 M potassium hydroxide (KOH) as electrolyte.

In order to discover the optimum loading of PPy in the graphene matrix to achieve maximum specific capacitance value of graphene/PPy composite, $NH_2$-G is utilized as model carbon carrier. The weight ratio of PPy to $NH_2$-G is varied from 1 to 80% for preparing $NH_2$-G/PPy composite. The CVs of $NH_2$-G supercapacitors with PPy weight ratio from 1 to 80% carried out at scan rate of 50 mV $s^{-1}$ are compared as shown in FIG. 3.

From the results obtained, it was found that 10% weight ratio loading of PPy gives the highest specific capacitance value as compared to that of 1%, 50% and 80% PPy loading. PPy weight ratio of 10% was selected to prepare graphene/PPy composite electrodes for the following experiments.

Example 3.3 Morphology of PPy Coated Graphenes Observed Using SEM

Figure 4:
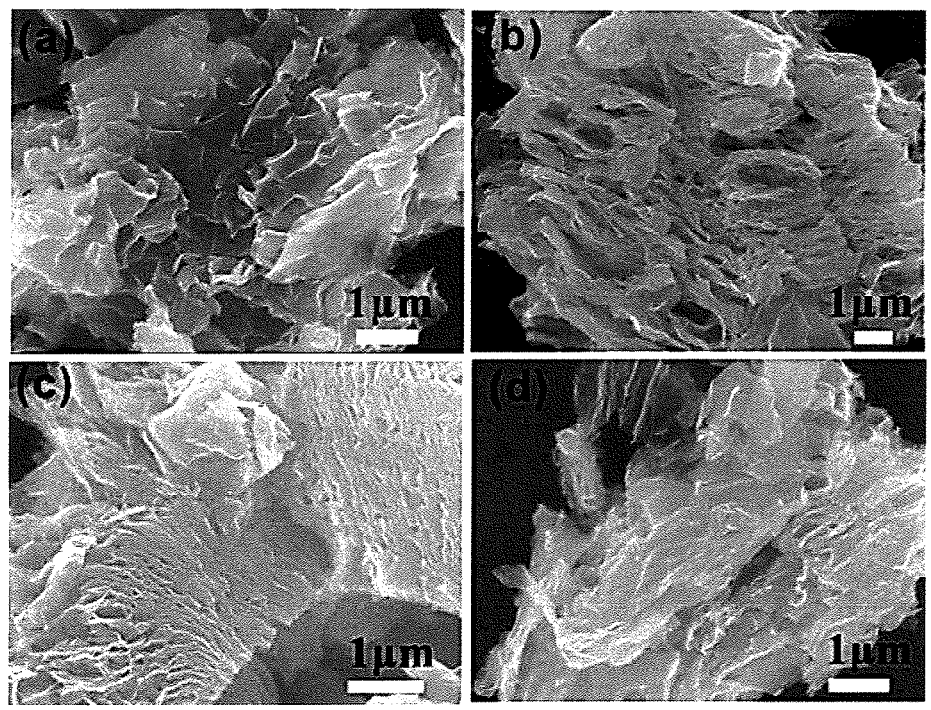
FIG. 4 shows scanning electron microscopy (SEM) images of (a) GO-PPy, (b) NG-PPy, (c) $NH_2$G-PPy, and (d) RG-PPy. The scale bar in the figures denotes 1 μm.

Morphology of PPy coated on the different types of graphenes was observed by SEM as shown in FIG. 4. All the as-prepared graphene maintained layered structure. As the PPy loading weight ratio is controlled at a low level of 10 wt % in the composite, aggregation of PPy in the composite, and blockage of graphene interlayers was not observed for all the samples. The PPy uniform coating on the surface of different graphenes is postulated to increase the electrochemical reaction sites due to the considerable high surface area provided by graphene.

Example 3.4 Cyclic Voltammetry

Cyclic voltammetry was used to investigate electrochemical performance of supercapacitor electrodes.

Figure 5:
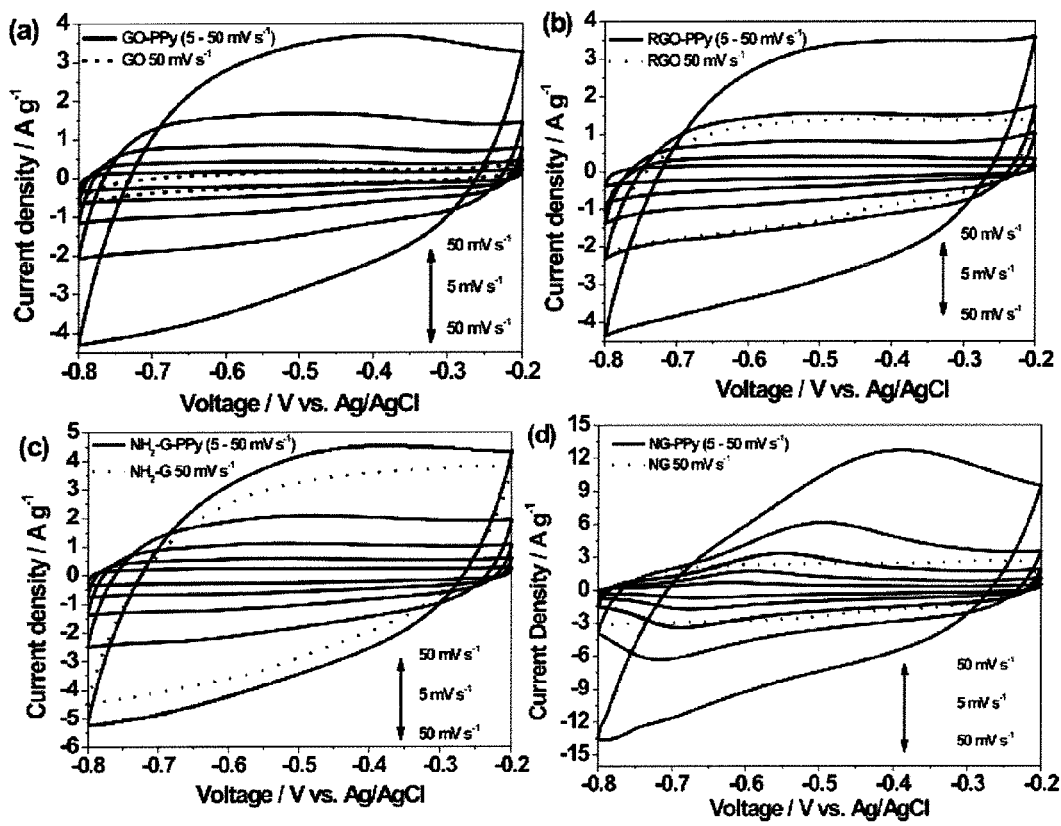
FIG. 5 are graphs showing cyclic voltammetry curves of (a) GO-PPy, (b) RG-PPy, (c) $NH_2$-G-PPy, and (d) NG-PPy with scanning rates from 5 to 50 $mVs^{-1}$ in 6 M KOH in black line. The inset dotted curves show corresponding GO, RG, $NH_2$-G, and NG respectively at scan rate of 50 $mVs^{-1}$. Y-axis: current density ($Ag^{-1}$); x-axis: voltage (V) vs. Ag/AgCl.

FIG. 5 shows the comparison of the CVs of GO (a), NG (b), $NH_2$-G (c), RG (d), before and after loading of 10% polypyrrole at a scan rate of 50 mV $s^{-1}$.

All four kinds of graphene show current density increment after loading of 10% polypyrrole, reflecting increase in charge storage. GO-PPy has comparable capacitance with that of RG-PPy. CV curves of pristine RG, NG, and $NH_2$-G show large integration area and exhibit rectangular shape, both of which are characteristic features for an ideal capacitor with good dynamic charge propagation.

Figure 6:
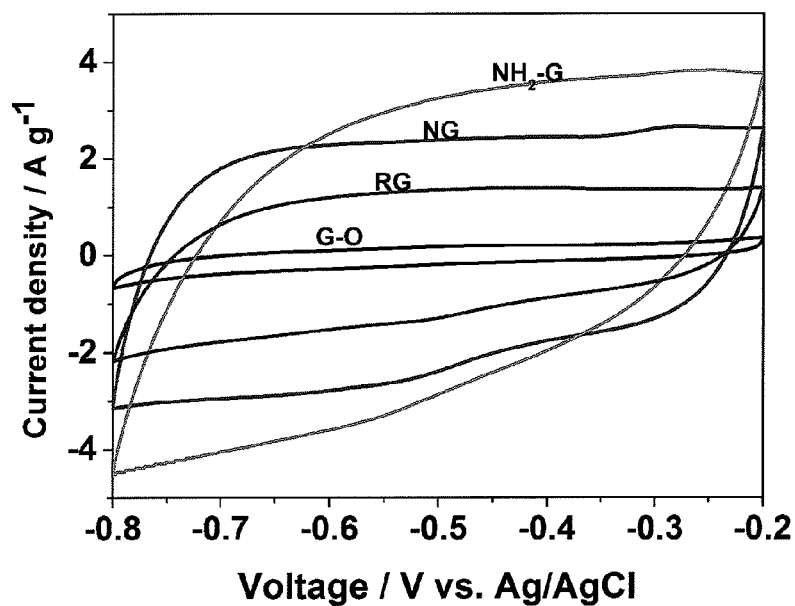
FIG. 6 are graphs showing cyclic voltammetry curves of GO, RG, NG, and $NH_2$-G at 50 mV $s^{-1}$ in 6M KOH electrolyte.

The specific capacitances of GO, NG, $NH_2$-G, RG calculated from the CV (as shown in FIG. 6) at 50 mV $s^{-1}$ are 6.56, 82.09, 94.73, and 42.90 F $g^{-1}$, respectively, with sample loading of 20 mg on nickel foam. NG and $NH_2$-G show larger capacitance value compared with that of RG, although NG, $NH_2$-G and RG; all have low oxygen content after nitrogen incorporation or reduction.

This phenomenon is consistent with effects of pseudocapacitive interactions of $NH_2$-G and N doped carbon, which is absent in RG. Specific capacitance of GO-PPy, NG-PPy, $NH_2$-G-PPy, and RG-PPy measured are 98, 267.38, 116.50 and 93.97 $Fg^{-1}$, respectively. All the graphene electrodes show enhanced performance after loading of 10 wt % polypyrrole, among which GO and NG show capacitance increment magnitude of about 14 and 3 times. After the loading of PPy, the average specific capacitance values of $NH_2$-G, RG, GO and NG increased by 1.15, 2.10, 12.19 and 3.55 times compared with those without loading of PPy. $NH_2$-G-PPy composite has capacitance value of 225.33 $Fg^{-1}$, which shows negligible increment compared with that of $NH_2$-G (205.33 F $g^{-1}$).

GO is regarded as poor electrode material due to its large electronic resistance; however as may be seen from above, GO-PPy and RG-PPy has comparable capacitance value with 10% PPy. The functional groups abundant NG, GO and $NH_2$-G surface are advantageous for pyrrole monomer adsorption and further polymerization. GO containing O-functional groups which aid in homogeneous coating of polymer, and GO itself may be slightly reduced during the in-situ polymerization process. Hence, GO-PPy achieved a capacitance value of 165.25 F $g^{-1}$, which is larger than that achieved by RG-PPy of 150.00 F $g^{-1}$.

Although N-containing functional groups on NG and $NH_2$-G facilitate PPy growth, high conductivity of NG is advantageous for charge separation and transportation after loading with PPy as compared to that of $NH_2$-G. Therefore, NG, which has both surface functional groups and relative high conductivity, are beneficial for PPy growth, and is more favorable for their corresponding electrochemical application.

Figure 7:
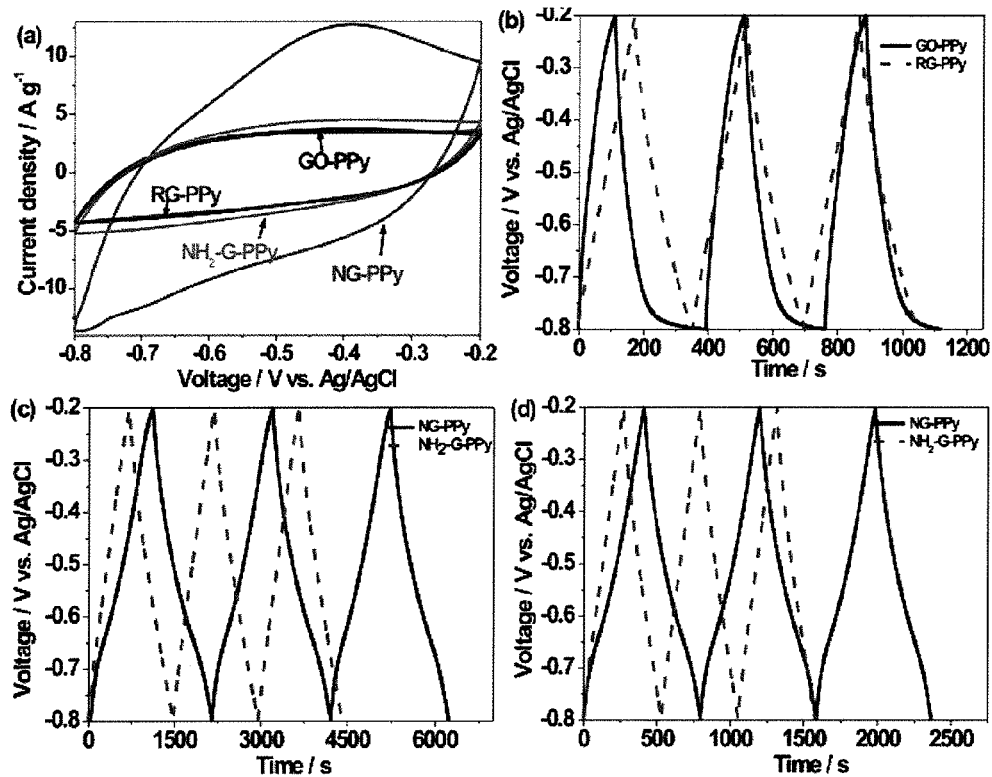
FIG. 7 depict graphs showing (a) comparison of CVs of GO, NG, $NH_2$-G, and RGO at a scan rate of 50 mV $s^{-1}$; and (b) charge-discharge curves of GO-PPy and RG-PPy at 0.26 A, (c) charge-discharge curves of NG-PPy, $NH_2$-G-PPy at 0.1 $Ag^{-1}$, and (d) NG-PPy, $NH_2$-G-PPy at 0.26 $Ag^{-1}$. In (a), y-axis: current density $Ag^{-1}$; x-axis: voltage (V) vs. silver/silver chloride (Ag/AgCl). In (b) to (d), y-axis: voltage (V) vs. Ag/AgCl; x-axis: time (s).

FIG. 7 shows the comparison of electrochemical performance of GO-PPy, NG-PPy, $NH_2$-G-PPy, and RG-PPy electrodes.

NG-PPy shows the highest CV integration area (FIG. 7a), followed by that of $NH_2$-G-PPy, GO-PPy and RG-PPy electrodes. The charge-discharge curves of GO-PPy and RG-PPy (FIG. 7b) are compared with $NH_2$-G-PPy, NG-PPy (FIG. 7d) under current density of 0.26 A $g^{-1}$. The unsymmetrical curve shape and degraded coulomb efficiencies of GO-PPy electrode indicates the poor conductivity owing to the presence of oxygeneous groups on GO without reduction. Hydroxyl, carboxyl, or even carbonyl functional group are reported capable of generating pseudocapacitance, however, the oxygen containing functional groups only demonstrate quasi-reversible capacitance value which gradually decrease after long cycling in alkaline electrolyte.

For RG, most of the oxygeneous groups were removed and the electronic properties recovered compared with that of GO. However, the poor wetting ability of RG may have hindered pyrrole monomer adsorption, leading to non-uniform polypyrrole coating, which reduces the surface area of polypyrrole in contact with the electrolyte and graphene. Therefore, the pseudocapacitive charge production from polypyrrole and transfer efficiency in carbon network is decreased accordingly.

FIG. 7c shows charge-discharge curves of NG-PPy and $NH_2$-G-PPy electrodes at current density of 0.1 A $g^{-1}$. Symmetric triangular shape of galvanostatic curves indicate the reversible Faradic reactions combined with improved conductivity as compared to that shown in FIG. 7b. The IR drop read from discharge curves at −0.2 V is much lower than that of GO-PPy or RG-PPy. The improved electrical properties due to nitrogen introduction and higher pseudocapacitive charge generation/transfer efficiency are responsible for excellent electrochemical performance of NG-PPy. The SEM image of NG-PPy shows that NG retains porous and layered structure after 550° C. annealing and polypyrrole coating. Together with NG porous structure, uniform PPy coating on NG 3D surface account for the large specific capacitance increments, as compared with that of RG-PPy. The specific capacitance of NG-PPy and $NH_2$-G-PPy electrodes calculated from galvanostatic curves under a current density of 0.26 A g$^{-1}$ are 338.8 and 230.1 F g$^{-1}$, which are in agreement with the values calculated from CV curves.

Figure 8:
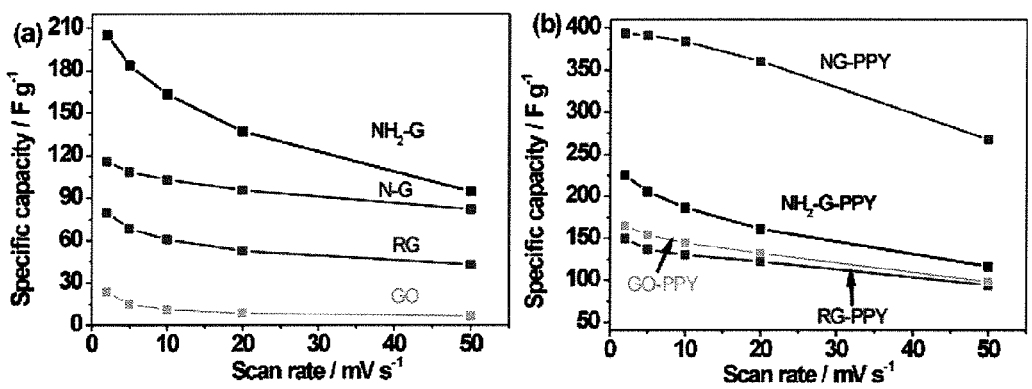
FIG. 8 depict graphs showing specific capacitance (F g$^{-1}$) of NH$_2$-G, N-G, RG, GO (a) before, and (b) after loading of 10% PPy with respect to the scan rate from 2 to 50 mV s$^{-1}$.

FIG. 8 shows the rate performance of the four electrodes with scan rates from 2 to 50 mV s$^{-1}$. Introduction of polypyrrole is responsible for the generation of pseudocapacitance from Faradic reaction of oxidation/reduction of polymer during doping and dedoping of ions which gives improved capacitance value. NG-PPy electrode has highest capacitance value of 393.67 F g$^{-1}$, as compared with those of $NH_2$-G-PPy (225.33 F g$^{-1}$), GO-PPy (165.25 F g$^{-1}$) and RG-PPy (150.00 F g$^{-1}$) under a scan rate of 2 mV s$^{-1}$. The capacitance value of NG-PPy can retain 267 F g$^{-1}$ at a scan rate of 50 mV s$^{-1}$, which further indicates the potential of NG-PPy for fast energy storage device applications.

Figure 9:
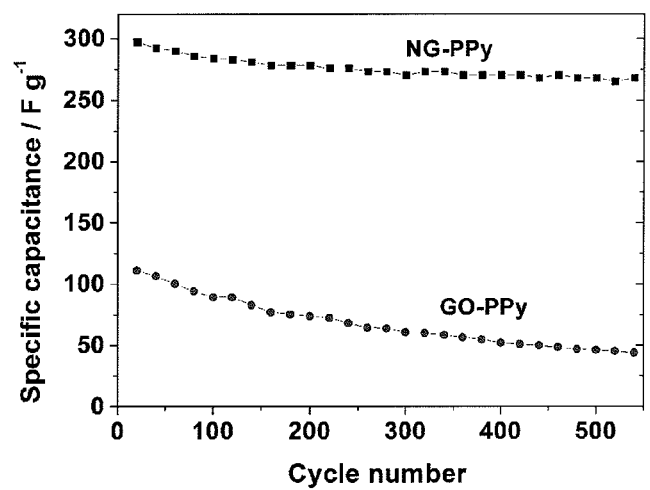
FIG. 9 depicts capacitance retention of NG-PPy and GO-PPy electrodes in first 540 charging/discharging cycles at a current density 0.26 A g$^{-1}$.

Cycling instability is regarded as the main hindrance for currently developed pseudocapacitors. The capacitance of GO-PPy lost 59% (from 111.3 to 43.9 F g$^{-1}$) after 540 charging/discharging cycles at a current density 0.26 A g$^{-1}$ as shown in FIG. 9. However, the capacitance of NG-PPy decreased only 10% (from 296.9 to 267.8 F g$^{-1}$) under same conditions. The deterioration of specific capacitance of GO-PPy electrode due to the large internal resistance compared to that of NG-PPy electrode may be clearly seen. NG-PPy has superior cycling stability over GO-PPy electrodes. Highest capacitance value and excellent cycling performance endows NG-PPy superior candidate in application of high capacity, cycling stable and fast energy storage devices.

Example 3.5 Electrochemical Impedance Spectroscopy (EIS)

Figure 10:
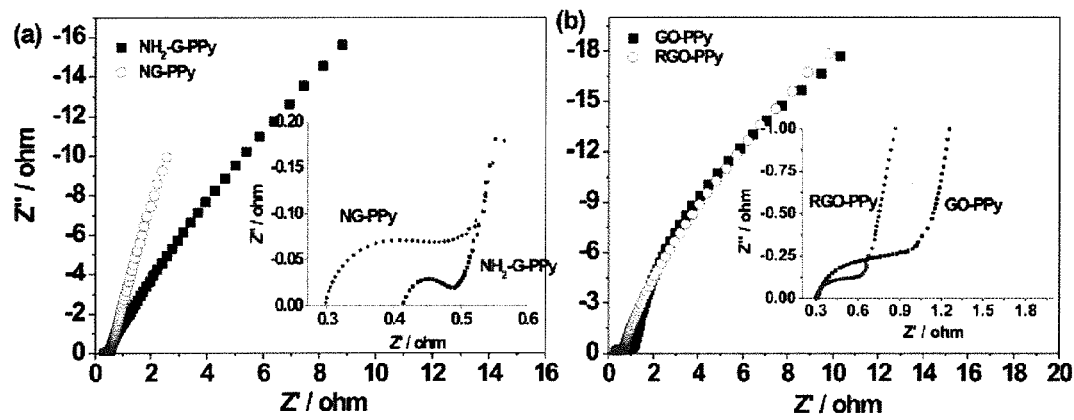
FIG. 10 shows Impedance Nyquist plots of (a) NH$_2$-G-PPy, NG-PPy, and (b) GO-PPy, RGO-PPy electrodes between 100 kHz and 10 mHz at 10 mV signal level. Y-axis: Z" (ohm); x-axis: Z' (ohm).

Electrochemical impedance spectroscopy (EIS) data further shows the electrochemical behaviour of different electrodes. The complex-plane impedance plots for $NH_2$-G-PPy and NG-PPy electrodes with frequency ranging from 0.01 to 100 K Hz at an applied potential of 10 mV are shown in FIG. 10.

All the impedance curves of four electrodes show semicircle in high frequency region and straight line in low frequency region. The impedance plot of NG-PPy is nearly perpendicular to real axis, which indicates fast charge-transfer kinetics and the electric responses resembling a circuit with low resistance and large capacitance connected in parallel. However, unlike NG-PPy, the as-prepared $NH_2$-G-PPy, GO-PPy, RG-PPy show 45 degree phase angle at low frequency, indicating the retarded ion mobility or charge transfer efficiency in the electrode. For the best two electrodes NG-PPy and $NH_2$-G-PPy, $NH_2$-G-PPy shows slightly lower internal resistance than that of NG-PPy.

The internal resistance demonstrated by the electrodes has multiple origins, e.g., inter-granular electronic resistance between carbon particles, or contact resistance between electrode material and current collector, as well as charge transfer resistance at electrode/electrolyte interface. Due to the complexity of internal resistance origin, superior performance of NG-PPy as supercapacitors has been attributed herein to the improved electronic properties from introduction of nitrogen in NG. High conductivity of NG facilitating charge transfer efficiency from ion doping and dedoping of PPy is responsible for the vertical lined response of Nyquist curve at low frequency. Therefore, NG-PPy has superior electrochemical behaviour among the four electrodes.

Figure 11:
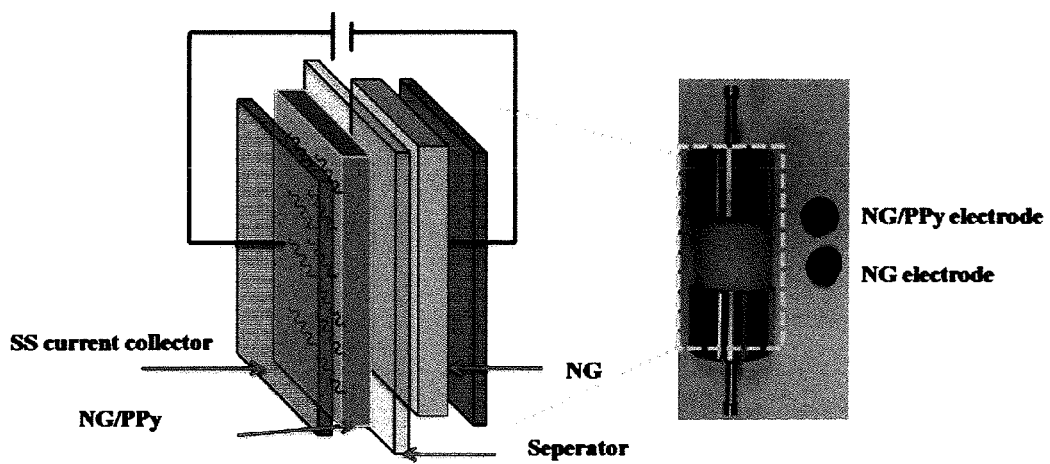
FIG. 11 depicts graphs showing (a) cyclic voltammograms of asymmetric capacitor N-RG-O/PPy//N-RG-O cell taken at various scan rates 20-450 mV s$^{-1}$; wherein y-axis: current density (Ag$^{-1}$); x-axis: voltage (V); and (b) galvanostatic charge/discharge curves taken between 0 and 1.25 V at various constant specific current 0.5 and 1 A g$^{-1}$ in 6 M KOH; wherein y-axis: voltage (V); x-axis: time (s). The schematic diagram depicted above FIGS. 11(a) and (b) shows the full cell configuration and image of as-prepared supercapacitor cell.
Figure 11:
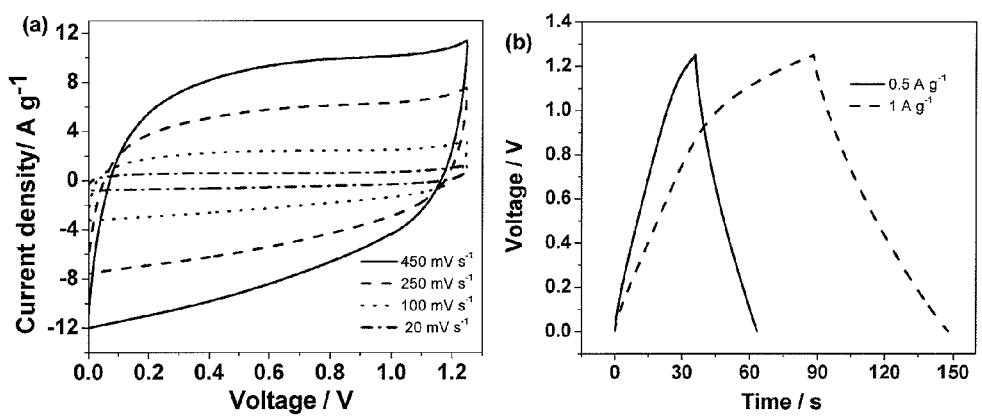

In the two electrode system, the NG-PPy also shows enhanced electrochemical activity superior than that of RG-PPy. The CV of the asymmetric capacitor device is shown in FIG. 11a. The hybrid device was cycled between 0 V and 1.25 V. The specific capacitance of the full cell device is 44, 39, 31 and 25 F g$^{-1}$, at scan rates of 5, 10, 50 and 250 mV s$^{-1}$. The specific capacitance of NG-PPy electrode is around 179, 158, 124, and 101 Fg$^{-1}$. The energy density of the device could be high as 7.2 Wh/kg. Assembly of the RG-PPy//NG supercapacitor devices was also attempted, however the capacitance of full cell is less than 20 Fg$^{-1}$ under the same measurement conditions, indicating NG is superior than RG for PPy loading for supercapacitor application.

Results of experiments carried out lead to understanding of the combined effect of polypyrrole growth and capacitance increment magnitude on carbon/polypyrrole based supercapacitors. NG-PPy shows best capacitive performance (393.67 Fg$^{-1}$) compared with RG-PPy (150 Fg$^{-1}$), $NH_2$-G-PPy (225.33 Fg$^{-1}$), and GO-PPy (165 Fg$^{-1}$). Incorporation of conducting polymer and porous carbon species with defined surface chemistry to form hybrid nanomaterials presents an opportunity for the design of novel materials with significantly improved performance as electrochemical supercapacitors. For graphene/polypyrrole composite based supercapacitors, the introduction of nitrogen doping in graphene network is important to improve graphene electrical properties and facilitate the uniform growth of polypyrrole on graphene both sides. Therefore, largest synergistic effect can be achieved from pseudocapacitance generation in uniform polypyrrole coating layers, and improved charge transfer efficiency from nitrogen doping induced excellent conductivity. The N doping induced capacitance improvement effect is also applicable to other graphitic material/conducting polymer composite preparation for promising energy storage applications.

Example 4: Synthesis of Various PANi/Graphene Composites

The PANi/graphene composites were synthesized via in-situ oxidative polymerization of aniline on the 4 different surface functionalized graphenes by using ammonium persulfate as an oxidant. The aniline monomer was doubly distilled before use. 200 mg of each type of functionalized graphene was individually ultrasonically dissolved in 20 mL of methanol. Then 2.38 mL of 0.1 M aniline in methanol was added drop by drop into the solution, which was contained in an icy bath under magnetic stirring. After another 10 min, 4.76 mL of 0.02 M ammonium persulfate and 0.2 M $LiClO_4$ in 1M $H_2SO_4$ was dripped in. The solution was shielded from light and kept in an ice bath, with magnetic stirring for 8 h to achieve full polymerization. The product was repeatedly washed with water, ethanol, and acetone to remove the residual oxidant. All of the composites were dried at 60° C.

Example 5: Characterization of Various PANi/Graphene Composites

The near-edge X-ray adsorption fine-structure (NEXAFS) measurements were carried out at the Surface, Interface, and Nanostructure Science (SINS) beamline of the Singapore Synchrotron Light Source. A total-electron yield mode with photon energy resolution of 0.1 eV was used. The XPS was collected with a Kratos Axis Ultra DLD (delay line detector) spectrometer. This XPS has a monochromatic Al Kα X-ray source with a resolution of 0.1 eV. Fourier transform infrared spectra (FT-IR) were recorded on a Shimadzu IR prestige-21 FTIR spectrophotometer.

The electrochemical performance of the samples was measured by cyclic voltammetry (CV) and galvanostatic spectroscopy at room temperature using 0.5 M $H_2SO_4$ as the electrolyte in a three-electrode cell using an Autolab PGSTAT302 electrochemical test system (Eco Chemie, The Netherlands). Electrochemical impedance spectroscopy (EIS) measurements were carried out over a frequency range from 10 kHz to 10 mHz in a 1M $H_2SO_4$ electrolyte. The applied voltage was 10 mV. The working electrode was fabricated by casting DI water-impregnated graphene ink onto a 5 mm diameter vitreous glassy carbon electrode. To prepare the graphene ink, 20 mg of a graphene/PANi were ultrasonically dispersed into 5 mL of DI water. 20 μL of the graphene/PANi ink was coated on the electrode and dried at 60° C. After dried, the electrode was deposited with 5 μL of Nafion solution containing 2-propanol (5 wt %, Dupont).

A capacitor was fabricated with $NH_2$-RG-O/PANi and N-RG-O electrodes which were separated by filter paper in 1 M $H_2SO_4$ electrolyte. The working electrode was prepared by mixing of $NH_2$-RG-O/PANi or N-RG-O (80 wt %) with PVDF binder (10 wt %) and carbon black (10 wt %) and then prepared the thin film by roll to roll process. The $NH_2$-RG-O/PANi thin film was then cut to disks with diameter of 1 cm. The weight of $NH_2$-RG-O/PANi and N-RG-O were 2.0 and 3.0 mg.

$NH_2$-RG-O was prepared via a solvothermal process in which ammonia water reacted with G-O in the presence of ethylene glycol as construed in example 1.2. Alternately, N-RG-O was produced from a reaction between G-O and $NH_3$ gas at high temperatures about 550° C. (vs. less than 200° C. for $NH_2$-RG-O) as construed in example 1.3. $NaBH_4$ efficiently reduces G-O and can decrease the presence of oxygenated groups.

Example 6: Discussion of Results Obtained from Graphene/Polyaniline Composites

Four different surface functionalized graphenes: graphene oxide (G-O); reduced G-O (RG-O); nitrogen doped graphene (N-RG-O), and primary amine modified graphene ($NH_2$-RG-O) were synthesized for use in 'graphene'/PANi composites.

In an attempt to achieve the highest synergistic effect between the chemically modified graphenes and PANi, the amount of conducting polymer loading was fixed at about 10 wt %. This value was chosen to prevent the blockage of micropores and the degradation of the graphene composite conductivity from excessive polymer loading.

Among the four samples, $NH_2$-RG-O showed an 8-fold capacitance increase after PANi loading. The 500 F $g^{-1}$ capacitance of $NH_2$-RG-O/PANi was larger than that of G-O/PANi (4.7 F $g^{-1}$), N-RG-O/PANi (68.47 F $g^{-1}$) and RG-O/PANi (207.11 F $g^{-1}$). Moreover, the $NH_2$-RG-O/PANi composite exhibited an unusually good cyclability and an increase in capacitance by a factor of 1.19 after 680 cycles at 2 mV $s^{-1}$. The effect of —$NH_2$ functional groups on the preparation and electrochemical performance of 'graphene'/PANi supercapacitors was carefully studied and elucidated as explained below.

The surface character of the different chemically modified graphenes was identified using FT-IR, XAS, and XPS.

Example 6.1 Surface Character Analysis by FTIR

Figure 12:
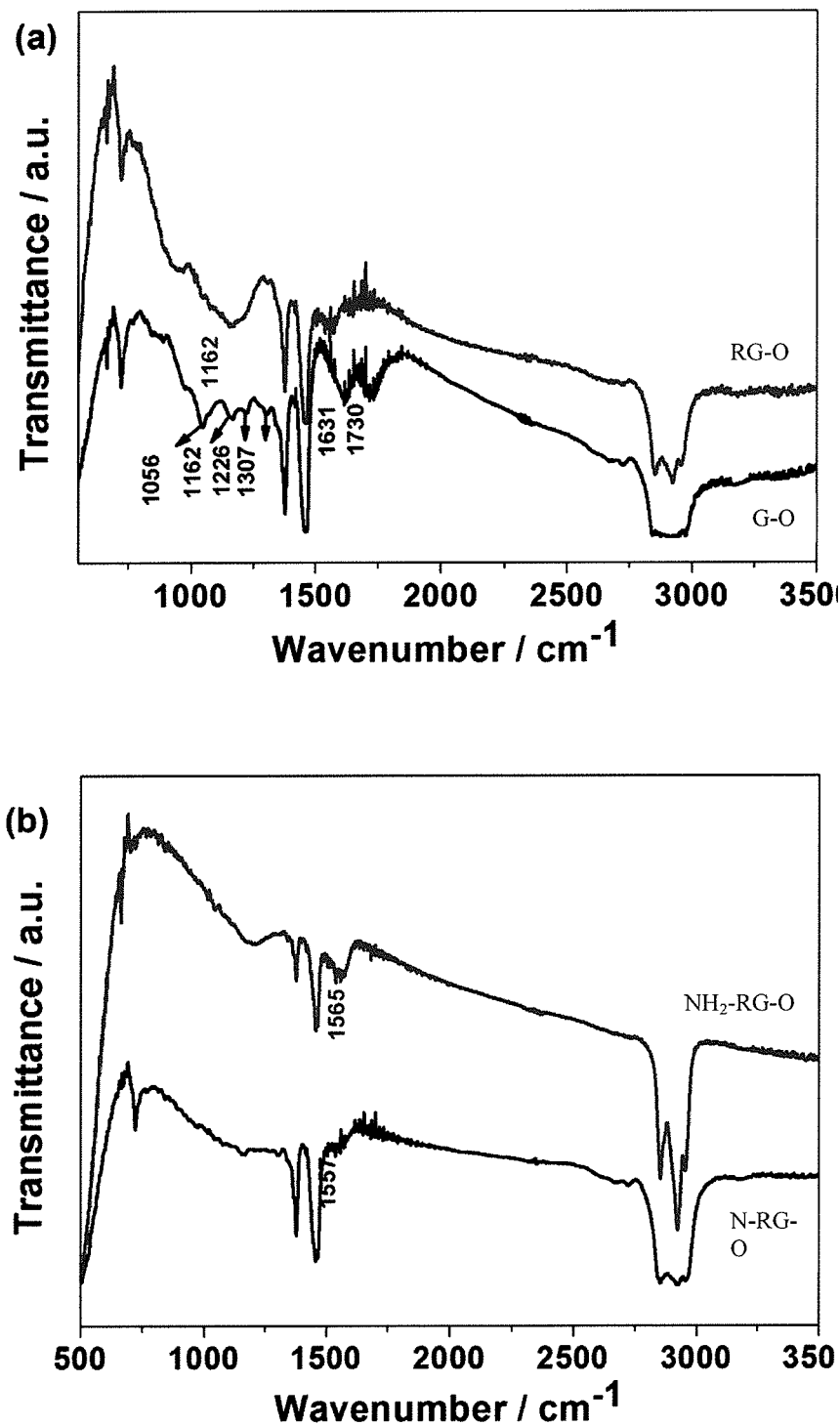
FIG. 12 depicts Fourier transform infrared spectroscopy (FT-IR) spectra of (a) G-O and RG-O; and (b) NH$_2$-RG-O and N-RG-O. Y-axis: transmittance (a.u.); x-axis: wavenumber (cm$^{-1}$).

G-O contains a wide range of oxygen functional groups both on the basal planes and at the edges of the G-O sheets. The FT-IR spectrum (FIG. 12a) of G-O demonstrates the presence of C—O in carbonyl ($v_{C-O}$ at 1056 $cm^{-1}$), C—O in carboxylic acid ($v_{C-O}$ at 1162 $cm^{-1}$), C—O—C ($v_{C-O}$ at 1226 $cm^{-1}$), C—OH ($v_{C-O}$ at 1307 $cm^{-1}$), and C=O in carboxylic acid and carbonyl moieties ($v_{C-O}$ at 1631 and 1730 $cm^{-1}$), in addition to the strong C=C stretching deformation of honeycomb carbon network at 1497 $cm^{-1}$. After the G-O is reduced by $NaBH_4$, the peak intensities of C—O (1056 $cm^{-1}$) and C=O (1631 and 1730 $cm^{-1}$) decrease significantly while the C=C graphene network vibration remains strong around 1600 $cm^{-1}$. A broad band of strong absorption around 1200 $cm^{-1}$ is due to the overlap of B—C vibration (1225 $cm^{-1}$) and —OH vibration (1200 $cm^{-1}$), this indicates the introduction of boron from the $NaBH_4$ reduction reaction and an incomplete reduction of G-O.

For $NH_2$-RG-O samples (FIG. 12b), the two distinct vibration bands besides the characteristic C=C peaks are IR absorptions at 1565 and 2800-2980 $cm^{-1}$; the former is the $sp^2$ C=N bond while the latter is the C—H stretching vibration of the $NH_2$-G bond. The C=N bond at 1565 $cm^1$ is not observed in the IR spectrum of N-RG-O (FIG. 12b) and indicates that $NH_2$-RG-O has higher nitrogen content than N-RG-O. From FIG. 12, it may also be seen that RG-O, $NH_2$-RG-O and N-RG-O have very low oxygen content compared to G-O.

Example 6.2 Surface Character Analysis by XAS

Figure 13:
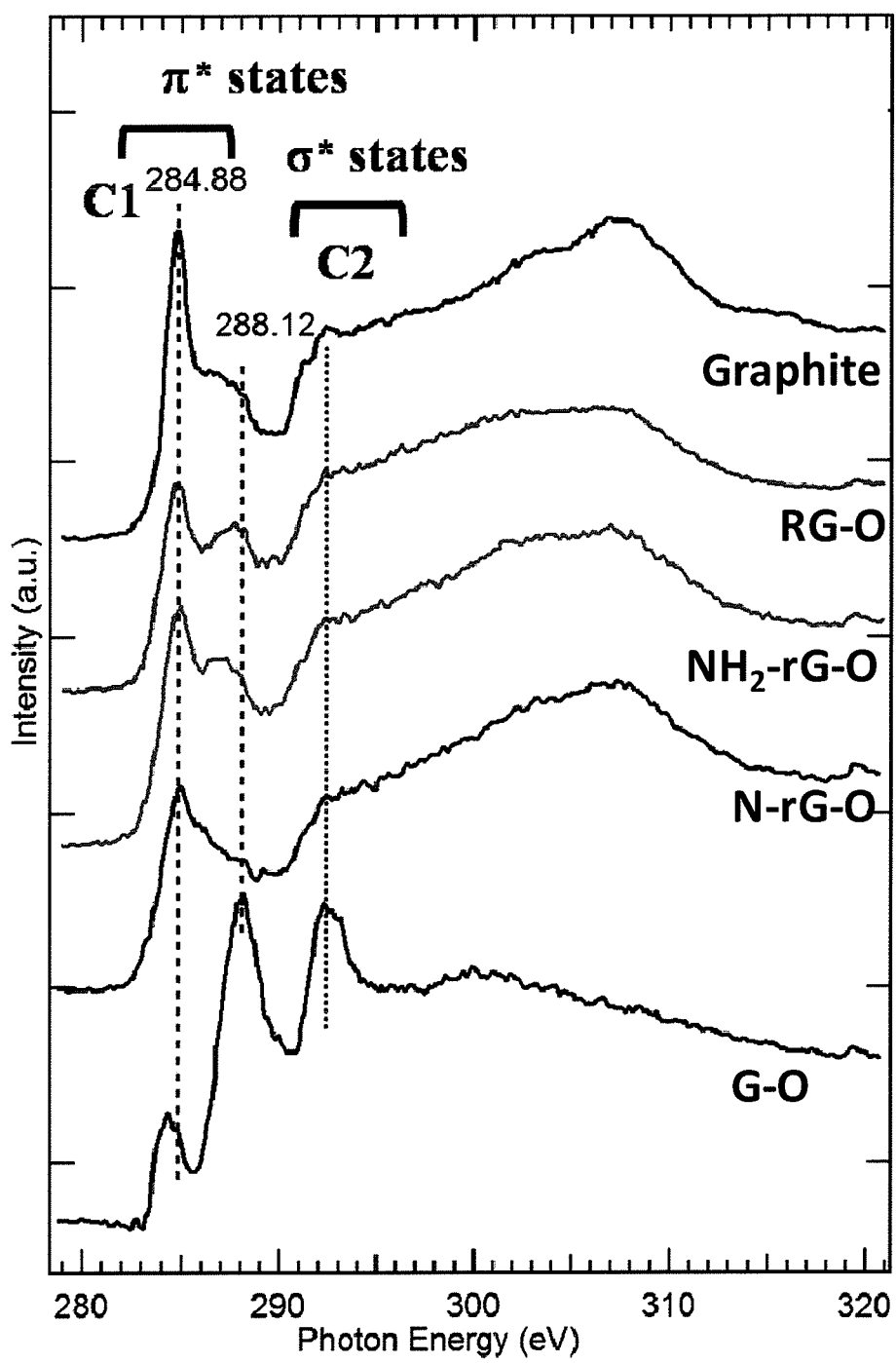
FIG. 13 depicts Near Edge X-Ray Absorption Fine Structure (NEXAFS) spectra at the C K edge of G-O, RG-O, NH$_2$-RG-O, and N-RG-O. The spectrum of graphite is also included for comparison. Y-axis: intensity (a.u.); x-axis: photon energy (eV).

The Carbon K near-edge x-ray absorption fine-structure spectra of the four different surface modified graphenes are shown in FIG. 13. The graphite spectrum is displayed as a reference. The main peak around 285 eV can be assigned to the C K edge $\pi^*$ resonance and is observable in all 5 spectra.

The strong peak at 293 eV is associated with the $\sigma^*$ resonance, while higher energy absorption bands at 295-315 eV are due to the transitions from C1s to higher conduction $\pi$ or $\sigma$ states. The absorption peak between 286 and 290 eV may be attributed to an interlayer transition and/or the presence of COOH and alkyl functional groups. This peak is remarkably strong in the G-O spectrum, indicating a high concentration of COOH and CO species. The $\sigma^*$ resonance feature at 293 eV is prominent in the G-O spectrum. This may be associated with the presence of large amount of COC and COH groups which are upright with respect to the carbon basal plane and therefore possess $\sigma$ symmetry.

It is noted that, compared to the other four samples, the main resonance of G-O at 284.8 eV is shifted to lower photon energy and a lower intensity, and both are indicative of more defects in the G-O $sp^2$ carbon network. For RG-O, the intensity ratio between the peaks at 288.1 and 293 eV and the main resonance peak at 284.9 eV suggests the removal of oxygen-containing groups and the repair of the graphene $\pi$ network. The C K NEXAFS spectra of $NH_2$-RG-O and N-RG-O are basically similar to that of RG-O in that the attachment of $NH_2$ groups or incorporation of substitutional N to the carbon $sp^2$ network does not affect the C K edge absorption directly.

Example 6.3 Surface Character Analysis by XPS

Based on the detailed analysis of XPS spectra, the surface elemental composition of these four graphene samples can be identified and quantified. As summarized in Table 1, the G-O sample has an oxygen content of 37% which is higher than RG-O (about 15%), N-RG-O (about 6%) and $NH_2$-RG-O (about 8%). The N-RG-O and $NH_2$-RG-O samples have about 5% and 9% nitrogen, respectively (hydrogen is not taken into account for the calculation).

TABLE 1

The portion of chemical species for different surface modified graphene based on XPS results.

|   | G-O | RG-O | NH$_2$— | N-RG-O |
|---|-----|------|---------|--------|
| N | —   | —    | 9.6     | 5.2    |
| C | 62.7| 84.9 | 82.5    | 89.0   |
| O | 37.3| 15.1 | 7.9     | 5.8    |

Example 7: Electrochemical Measurements of Polyaniline Containing Composites

When polyaniline is used as the CP, the weight ratio used was also 10 wt %. Cyclic voltammetry of polyaniline/graphene composite were run in 1 M H$_2$SO$_4$ electrolyte with different potential window for different potential windows under which the largest capacitance is obtained.

Figure 14:
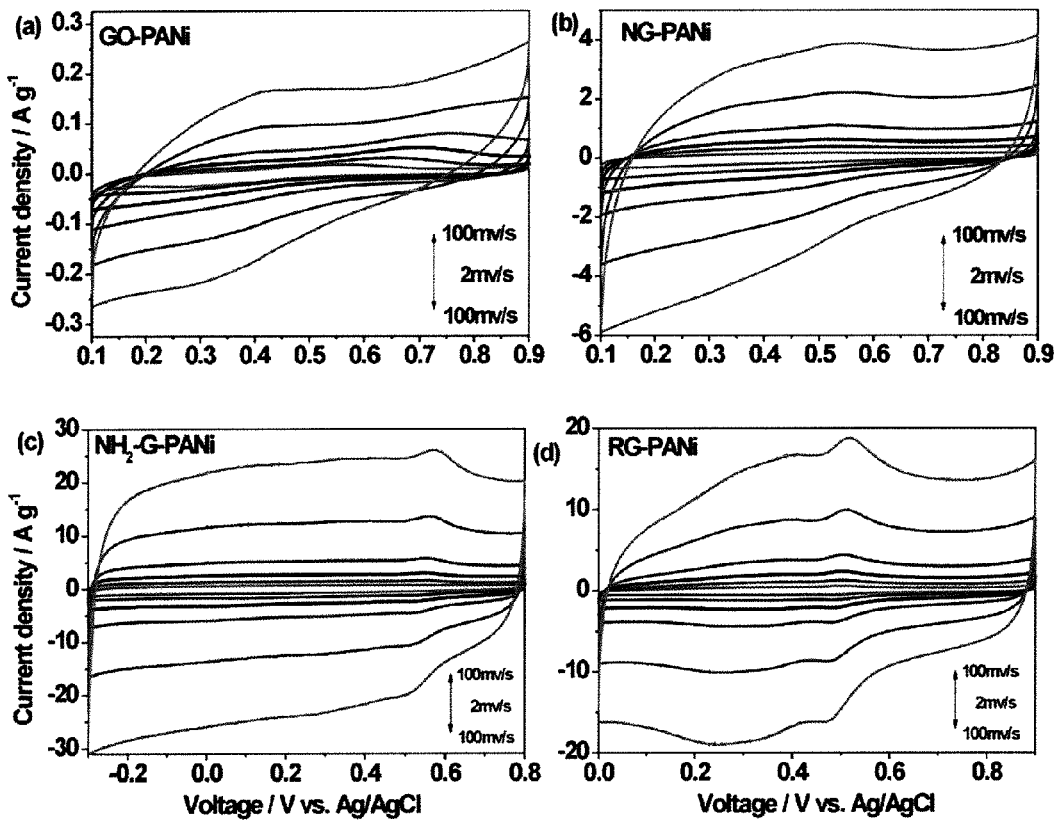
FIG. 14 depicts graphs showing cyclic voltammograms of (a) GO-PANi, (b) NG-PANi, (c) NH$_2$-G-PANi, and (d) RG-PANi recorded at different scan rate from 2 to 100 mV s$^{-1}$ (PANi denotes polyaniline). Y-axis: current density (Ag$^{-1}$); x-axis: voltage (V) vs. Ag/AgCl.

FIG. 14 depicts cyclic voltammograms of GO-PANi (a), NG-PANi (b), NH$_2$-G-PANi (c), and RG-PANi (d) recorded at different scan rate from 2 to 100 mV s$^{-1}$.

A pair of new redox peak (0.52 V vs. Ag/AgCl) appears in NH$_2$-G-PANi, which represented pseudocapicitive of PANi, indicative the Faradic transformation of emeraldine-pernigraniline. It is worth to note that the cathodic peaks and anodic peaks position of NH$_2$-G-PANi do not shift with the increment of potential sweep rates which indicate the fast charge transfer of pseudocapacitive charge from PANi to NH$_2$-G. More importantly, the curve shape of NH$_2$-G-PANi composites are maintained even at a high scan rate of 100 mV s$^{-1}$, indicating the good capacitive behaviour, rapid charge transfer efficiency of doping and dedoping produced pseudocapacitance.

Comparison of gravimetric capacitances of different graphene/PANi composites and graphene further shows the significant improvement of capacitance value from PANi doping. Different graphene show different order of capacitance increment magnitude after incorporated with PANi. NH$_2$-G-PANi composite has largest specific capacitance (437.91 F g$^{-1}$), which is more than one times larger than that of RG-PANi (207.11 F g$^{-1}$). The excellent performance of NH$_2$-G-PANi may be due to the presence of surface functionalities facilitate monomer adsorption but also has significant enhancement for charge transfer and pseudocapacitance generation. For graphene and polyaniline composite tested in 0.5 M H$_2$SO$_4$ electrolyte, NH$_2$-G-PANi shows the highest capacitance value (FIG. 15b), followed by that of RG-PANi, NG-PANi and GO-PANi electrodes.

The results of investigation lead to understanding the combined effect of CP growth and capacitance increment magnitude on surface modified carbon/CP composite. Incorporation of CP with porous carbon species with defined surface chemistry to form hybrid nanomaterials represents an opportunity for the design of novel materials with significantly improved performance as electrochemical supercapacitors The electrolyte has different effects on different CP/carbon composite due to the different acidity and pseoducapacitance generation mechanism. N modified graphene/PPy and —NH$_2$ abundant graphene/PANi according to embodiments have shown significantly improved performance as supercapacitor electrodes in alkaline and acidic electrolyte respectively.

With the controllable easy and low cost synthesis of the carbon with defined N species have excellent capacitive behavior and long cycle life, the invention according to various embodiments may be commercialized immediately, such as in the clean energy industry.

Embodiments of the present invention use porous carbon as electroactive material, wherein the underlying energy storage mechanism is EDLC. The SC value strictly relies on the surface area and micropores available for penetration of electrolyte ions, which is normally smaller than 30 F/g. Conducting polymers with weight ratio lower than 10% are coated onto nitrogen containing carbon as electroactive materials. Pyridinic, pyrrolic and graphitic N abundant carbon/Ppy material in various embodiments shows superior energy storage performance than that of carbon with others surface functional group in alkaline electrolyte. —NH$_2$ grafted carbon/PANi material in various embodiments demonstrates a significant better performance as supercapacitor electrodes than that of G-O or RG-O, and N-G in acidic electrolytes.

Example 7.1 Cyclic Voltammetry

FIG. 14 displays CV curves at various scan rates for the four graphene/PANi samples after loading about 9 wt % PANi. All of the graphene/PANi samples show a great increase in the current density compared to their counterpart graphenes without PANi. The capacitance can be calculated from the CV curves according to the equation (3)

$$C = \frac{\left(\int i dV\right)}{vmV} \quad (3)$$

where i denotes current density (A), V denotes potential (V), v denotes scan rate (mV s$^{-1}$), and m denotes mass of the graphene/PANi composite in the electrode (g).

Figure 15:
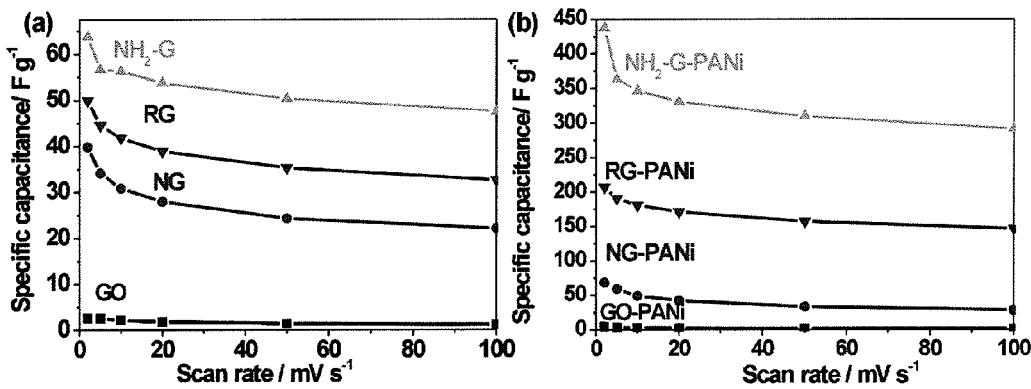
FIG. 15 depicts graphs showing specific capacitance of different surface functionalized graphene (a) before and (b) after loading of 10 wt % PANi as a function of scan rate (from 2-100 mVs$^{-1}$) in 1 M H$_2$SO$_4$ electrolyte. Y-axis: specific capacitance (F g$^{-1}$); x-axis: scan rate (mV s$^{-1}$).

As shown in FIG. 15, NH$_2$-RG-O increases its capacitance 8-fold due to the PANi loading, reaching 420 F/g at a scan rate of 2 mV s$^{-1}$. This is larger than that of G-O/PANi (4.7 Fg$^{-1}$), N-RG-O/PANi (68.47 Fg$^{-1}$) and RG-O/PANi (207.11 Fg$^{-1}$) under identical measurement conditions. BET surface area of G-O/PANi, RG-O/PANi, NH$_2$-RG-O/PANi, N-RG-O/PANi, and the G-O, which are around 289, 265, 320, 358, and 310 m$^2$ g$^{-1}$ respectively. The PANi/N-RG-O has largest BET surface area, and also relatively higher conductivity. However, the four samples do not show significant difference of BET value. Therefore, their different electrochemical behavior would come from the synergistic effect from both graphene and PANi. Note that the specific capacitance of NH$_2$-RG-O/PANi is more than twice that of RG-O/PANi. The capacitance value of NH$_2$-RG-O/PANi remains as high as 291 F g$^{-1}$ even under high scan rates of 100 mV s$^{-1}$, which may be a benefit of the high conductivity of the graphene/PANi composites.

Example 7.2 Stability Study

Figure 16:
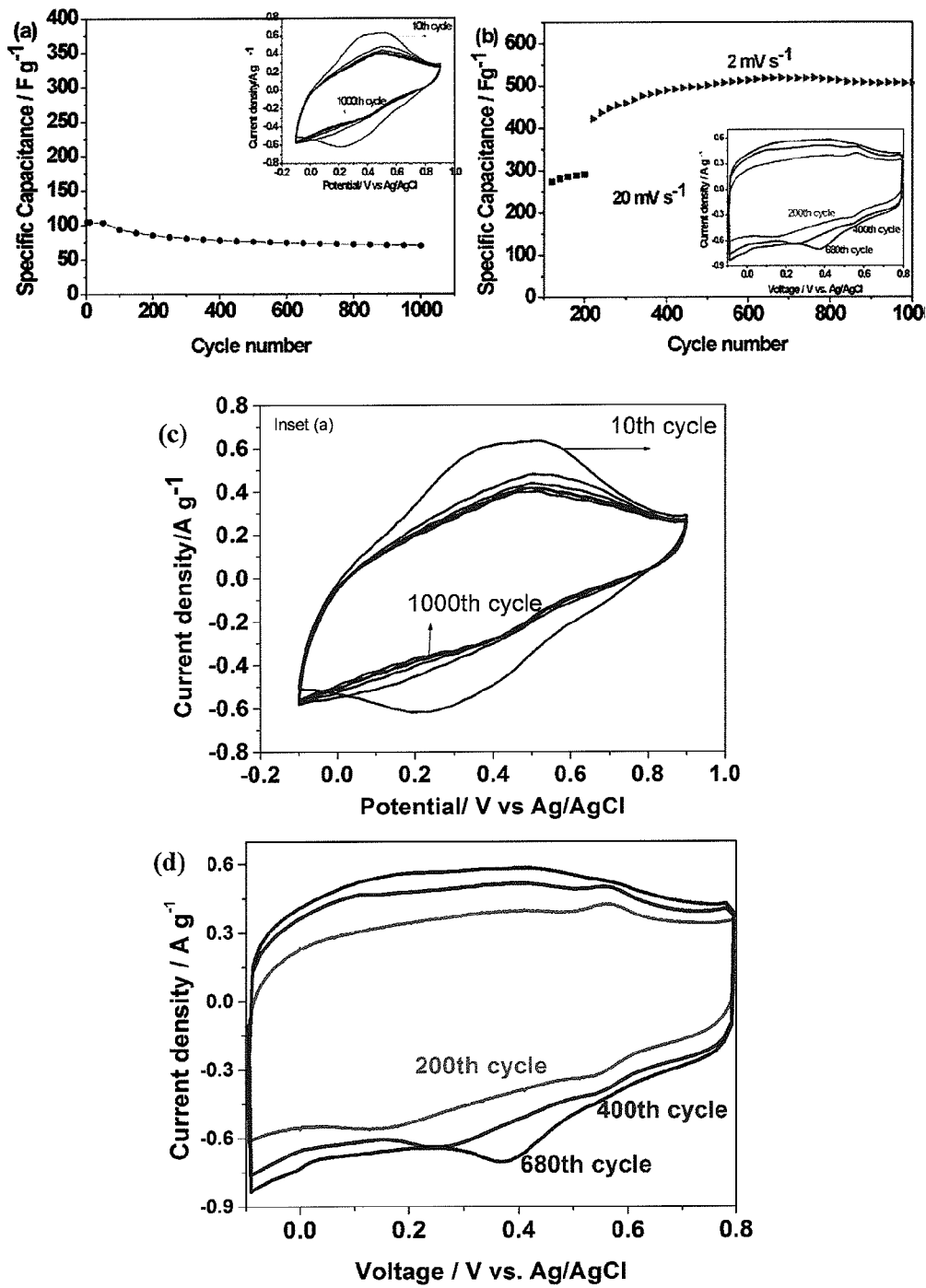
FIG. 16 depicts graphs showing cyclic-life data of (a) RG-PANi electrode; and (b) NH$_2$-G-PANi. The specific capacitance is calculated from CV curves at a scan rate of 50 mV s$^{-1}$ in 1 M sulfuric acid (H$_2$SO$_4$) electrolyte. Y-axis: specific capacitance (F g$^{-1}$); x-axis: cycle number. Inset figure shows the CVs during the 1000 cycles. The inset figures in (a) and (b) are shown as (c) and (d) respectively.

A stability study of NH$_2$-RG-O/PANi and RG-O/PANi was performed by cyclic voltammetry. RG-O/PANi exhibits a decay in the capacitance with increasing cycle number (see FIG. 16a). An interesting phenomenon is observed with NH$_2$-RG-O/PANi where the specific capacitance increases significantly with increasing cycle number (FIG. 16b). After 100 cycles of charge/discharge activation at a scan rate of 50 mV s$^{-1}$, the CV curves were recorded at scan rate 20 mV S$^{-1}$ from 120 to 220 cycles and then at scan rate of 2 mV s$^{-1}$ from 220 to 680 cycles. The different scan rates were adapted in order to shorten the activation time period. Note that the capacitance value gradually increases from 420 F/g initially, to 500 F/g at 200 cycles and remains stable up to 680 cycles.

Figure 17:
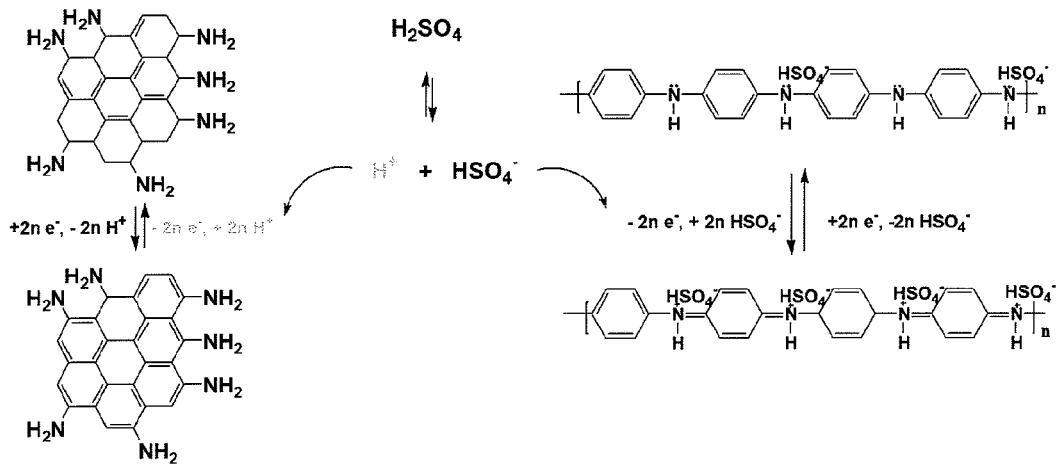
FIG. 17 is a process scheme illustrating that amine functional groups in NH$_2$-RG-O react with protons to produce imine or protonated amine, while the consumption of H$^+$ in electrolyte helps H$_2$SO$_4$→HSO$_4^-$ dissociation.

In that system, the improved conductivity was reasoned to be due to the reduction of oxygen content in GO with increasing cycles. In the present case, the capacitance increase is possibly due to the doping and dedoping of sulfate ions on the PANi polymer assisted by the simultaneous fast Faradic reactions of primary amine with H$^+$. The doping and dedoping of ions during the oxidation and reduction of PANi is responsible for the pseudocapacitive charge generation in these capacitors. This synergistic effect can result in the doubled charge storage processes as shown in the process scheme shown in FIG. 17.

Example 7.3 Electrochemical Impedance Spectroscopy (EIS)

Electrochemical impedance spectroscopy (EIS) was used to measure the internal resistance, charge transfer kinetics, and ion diffusion process of the four graphene/PANi composites. The EIS was measured over a frequency range of 10 kHz to 10 mHz.

Figure 18:
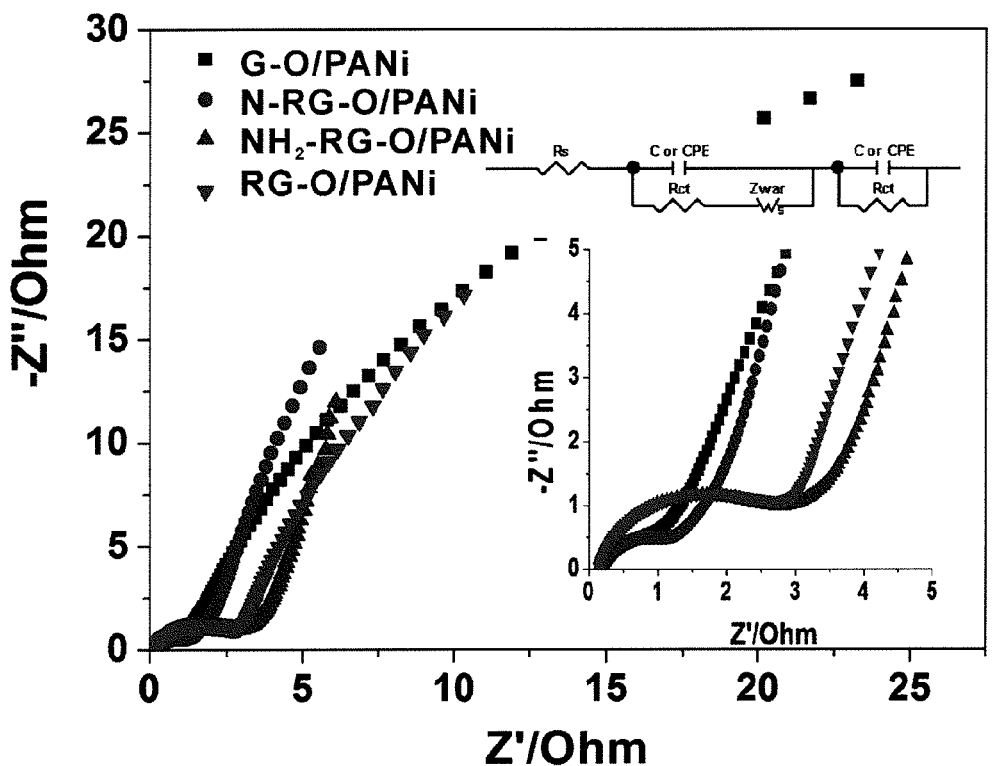
FIG. 18 shows electrochemical impedance plots of G-O/PANi, N-RG-O/PANi, NH$_2$-RG-O/PANi, and RG-O/PANi. Y-axis: Z" (ohm); x-axis: Z' (ohm). The spectra were taken in 1M H$_2$SO$_4$ in a frequency range from 10 kHz to 10 mHz. A Randles equivalent circuit representing the circuit elements for the Nyquist plot is shown in the inset. R is solution resistance, C or CPE represents double layer capacitance or constant phase element, R$_{et}$ is charge transfer resistance, and Z$_{war}$ is diffusion-controlled Warburg impedance.

The Nyquist plots in the high frequency region in FIG. 18 resemble an incomplete semi-circle. The semicircle impedance plots have been reported for many carbon, carbon nanotube, and graphene-based supercapacitors. They can be well-modeled using a complex equivalent circuit as shown in the inset in FIG. 18. $R_s$ is the series solution resistance, which may include the electrolyte resistance and the active material/current collector contact resistance. Two capacitors C (or more realistically, two constant phase elements, CPE, which take into consideration the electrode surface inhomogeneity) represent double layer capacitance and Faradic capacitance, respectively. $R_{ct}$, in parallel to C, is the charge transfer resistance at the electrode/solution interface, while $Z_{war}$ is the ion diffusion-controlled Warburg impedance.

In the NH$_2$-RG-O/PANi case, when the frequency decreases and the impedance vector moves further from (Z'=3 Ohm, Z"=1 Ohm), the phase angle does not decrease as in an ideal semicircle. Rather, the phase angle increases continuously with further decreases in frequency. This means that the polarization impedance reduces its contribution (i.e., the kinetic and charge transfer are no longer rate-determining steps) while mass capacitance remains the dominant component of the system impedance. Hence the EIS data are consistent to the other electrochemical measurements shown and discussed above, and they indicate that NH$_2$-RG-O/PANi is the best electrode material for supercapacitor applications, demonstrating low internal resistance, very good charge transfer and excellent ionic conductivity.

Figure 19:
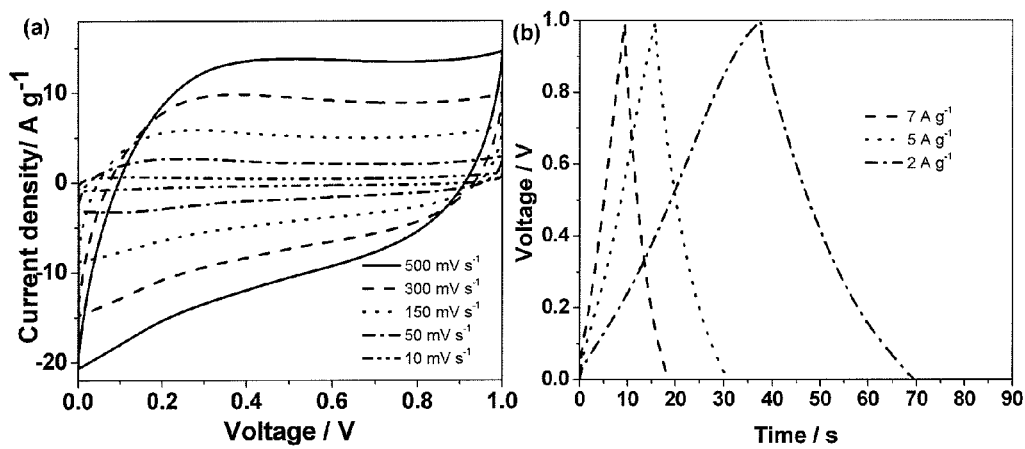
FIG. 19 depicts graphs of (a) CVs taken at various scan rates 10-500 mV s$^{-1}$ (Y-axis: current density (Ag$^{-1}$); x-axis: voltage (V)); and (b) galvanostatic charge/discharge curves taken between 0 and 1 V at various constant current 2-7 A g$^{-1}$ for the asymmetric capacitor NH$_2$-RG-O/PANi//N-RG-O in 1M H$_2$SO$_4$ (Y-axis: voltage (V); x-axis: time (s)).
Figure 20:
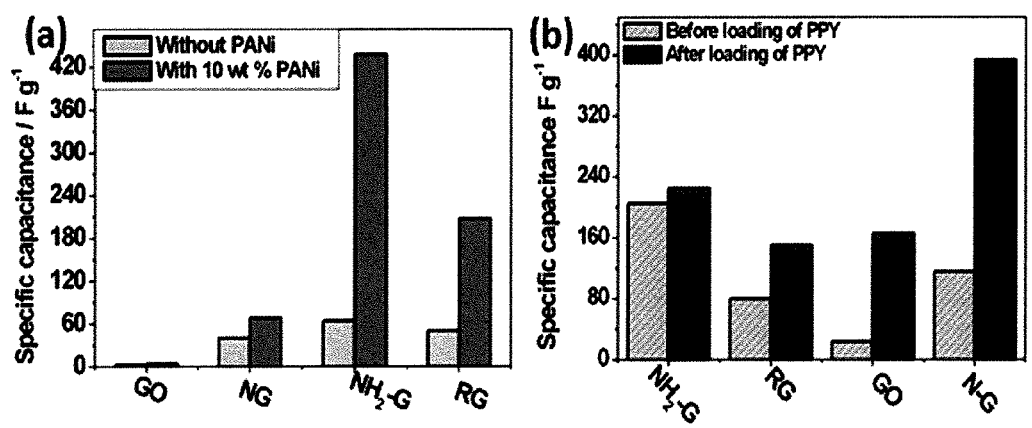
FIG. 20 depicts graphs showing specific capacitance of NH$_2$-G, RG, GO and N-G before (light gray) and after (black) loading of (a) 10 wt % PANi; and (b) 10 wt % of PPy. Y-axis: specific capacitance (F g$^{-1}$).

N-RG-O was used as the cathode material, and NH$_2$-RG-O/PANi as anode electrode. The electrochemical performance of NH$_2$-RG-O/PANi//N-RG-O cell is measured in 1 M H$_2$SO$_4$ (FIG. 19). The capacitance of full cell is 35, 43, 52, 69 and 79 during scan rate of 500, 300, 150 and 10 mV s$^{-1}$.

The specific capacitance per mass of one pellet electrode is calculated according to the equation (4):

$$C_{spec}=2C/m \quad (4)$$

where C is the experimental measured capacitance of the supercapacitor; and m is the mass percentage of NH$_2$-RG-O/PANi electrode. Therefore, the specific capacitance of PANi-NH$_2$-RG-O electrode under scan rate of 500, 300, 150, 50 and 10 mV s$^1$, are 175, 213, 261, 346 and 395 F g$^{-1}$, respectively, which were higher than those reported PANi/CNT (320 F g$^{-1}$) in 2-electrode testing environmental. In present case, the loading weight ratio of PANi reduced to about 10%. At a charge/discharge rate of 2.0, 5.0, and 7.0 A g$^{-1}$, are 69.4, 56 and 48 F g$^{-1}$, while the specific capacitances of PANi-NH$_2$-RG-O electrode are 345, 280 and 240 F g$^{-1}$ respectively.

The results agree well with the values calculated from the CVs. At a charge/discharge rate of 2.0 A g$^{-1}$, the energy density of our two-electrode cell can be as high as 9.6 Wh/kg, as calculated from E=CV$^2$/2. The cycling performance, which is analyzed by galvanostatic charge/discharge of the NH$_2$-RG-O/PANi//N-RG-O cell under 1.0 V with a current density of 2 A g$^{-1}$, gave a 85% capacitance maintain after 1000 cycles.

Four different surface functionalized graphenes were used as carriers for preparing chemically-modified-graphene/PANi composites. The largest capacitance of 500 Fg$^{-1}$ (all values are with respect to the combined mass of PANi and chemically modified graphene that are derived from measurements on a 3-electrode cell) was measured for a 'NH$_2$-RG-O/PANi' composite, which was an 8-fold improvement over a 'NH$_2$-RG-O' without PANi loading composite and was much larger than that of 'G-O/PANi' (4.7 Fg$^{-1}$), 'N-RG-O/PANi' (68.47 Fg$^{-1}$) and 'RG-O/PANi' (207.11 Fg$^{-1}$). Most importantly, a factor of 1.19 increase in capacitance was observed for NH$_2$-RG-O/PANi as the cycle number increased to 680 cycles, while the capacitance decay with increasing cycle numbers was measured for the other three graphene/PANi composites. The amine functional groups in NH$_2$-RG-O react with protons to produce imine or protonated amine, while the consumption of H$^+$ in the electrolyte helps H$_2$SO$_4$→HSO$_4^-$ dissociation. The amine red-ox reactions can therefore assist the doping and de-doping in PANi, and might be responsible for the increased capacitance in long cycling.

Controlling the carbon surface chemistry is of significant importance when growing polymer on the carbon carrier. NH$_2$-RG-O and RG-O contain unreduced hydroxyl groups, which are advantageous for supercapacitors. N-RG-O, which was reduced under an inert gas atmosphere, was doped with graphitic and pyridinic nitrogen atoms with poor wettability. GO holds a high concentration of oxygen functionalities, but the poor conductivity severely hinders it for electrochemical applications. Therefore, NH$_2$-RG-O and RG-O, containing N heteroatoms, is able to improve the capacitance of the electrode, with unreduced hydroxyl groups on NH$_2$-RG-O also possibly contributing to the capacitance.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:
1. A composite comprising a conducting polymer and a graphene-based material, the composite comprising
   a) a graphene-based material doped with nitrogen or having a nitrogen-containing species selected from the group consisting of an amine group, an amide group, and a nitrile group directly grafted to a graphitic carbon atom that forms part of a ring structure of the graphene-based material, and b) a coating consisting of the conducting polymer formed directly on a surface of the graphene-based material, wherein the composite comprises 1 to 10 wt % of the conducting polymer.

2. The composite according to claim 1, wherein the graphene-based material comprises reduced graphene oxide.

3. The composite according to claim 1, wherein the nitrogen in the graphene-based material doped with nitrogen is pyridinic-N, pyrrolic-N, graphitic-N, or mixtures thereof.

4. The composite according to claim 1, wherein the nitrogen-containing species is an amine group.

5. The composite according to claim 1, wherein the conducting polymer is selected from the group consisting of polyaniline, polypyrrole, polythiophene, poly(phenylenevinylene), poly(phenylene sulfide), polydiphenylamine, polythienylenevinylene, bithiophene, polyethylenedioxythiophene, polytriazine, polyacetylene, derivatives thereof, and mixtures thereof.

6. The composite according to claim 1, wherein the conducting polymer is polyaniline or polypyrrole.

7. The composite according to claim 1, wherein the coating consisting of the conducting polymer has a thickness that is at least substantially uniform.

8. The composite according to claim 1, wherein the graphene-based material comprises reduced graphene oxide doped with nitrogen and the conducting polymer comprises polypyrrole.

9. The composite according to claim 1, wherein the graphene-based material comprises reduced graphene oxide grafted with an amine group and the conducting polymer comprises polyaniline.

10. A method of preparing a composite comprising a conducting polymer and a graphene-based material, the method comprising a) providing a graphene-based material doped with nitrogen or having a nitrogen-containing species selected from the group consisting of an amine group, an amide group, and a nitrile group directly grafted to a graphitic carbon atom that forms part of a ring structure of the graphene-based material, b) contacting the graphene-based material with a solution comprising monomers of the conducting polymer; and c) polymerizing the monomers of the conducting polymer on the graphene-based material in the presence of an oxidant to form a coating of the conducting polymer directly on a surface of the graphene-based material, wherein the composite comprises 1 to 10 wt % of the conducting polymer.

11. The method according to claim 10, wherein providing the graphene-based material doped with nitrogen comprises annealing a graphene-based material in an environment consisting essentially of an inert gas and ammonia.

12. The method according to claim 11, wherein annealing the graphene-based material is carried out at a temperature in the range of 200° C. to 1000° C.

13. The method according to claim 11, wherein the amount of ammonia gas in the environment is in the range of 1 wt % to 100 wt %.

14. The method according to claim 10, wherein providing the graphene-based material having a nitrogen-containing species grafted thereon comprises a) dispersing a graphene-based material in a solution comprising a reducing agent to form a first suspension;

b) adding a solution comprising a nitrogen-containing species to the first suspension to form a second suspension; and c) subjecting the second suspension to a solvothermal process to graft the nitrogen-containing species on the graphene-based material.

15. The method according to claim 14, wherein the reducing agent comprises a polar organic solvent.

16. The method according to claim 15, wherein the reducing agent comprises ethylene glycol.

17. The method according to claim 14, wherein the solvothermal process is carried out at a temperature in the range of 80° C. to 250° C.

18. The method according to claim 10, wherein the graphene-based material doped with nitrogen or having a nitrogen-containing species grafted thereon comprises reduced graphene oxide.

19. The method according to claim 10, wherein the conducting polymer is polyaniline or polypyrrole.

20. The method according to claim 10, wherein oxidant is selected from the group consisting of iron (III) salts, copper (II) salts, silver (I) salts, hydrogen peroxide, ammonium persulfate, and mixtures thereof.

21. The method according to claim 10, wherein polymerizing the monomers of the conducting polymer on the graphene-based material is carried out in the absence of light and at a temperature in the range of 0° C. to 10° C.

22. An electrode formed from a composite comprising a) a graphene-based material doped with nitrogen or having a nitrogen-containing species selected from the group consisting of an amine group, an amide group, and a nitrile group directly grafted to a graphitic carbon atom that forms part of a ring structure of the graphene-based material, and b) a coating consisting of a conducting polymer formed directly on a surface of the graphene-based material, wherein the composite comprises 1 to 10 wt % of the conducting polymer.

* * * * *